(12) United States Patent
Kim et al.

(10) Patent No.: US 12,341,265 B2
(45) Date of Patent: Jun. 24, 2025

(54) ELECTRONIC APPARATUS COMPRISING ANTENNA

(71) Applicant: SAMSUNG ELECTRONICS CO., LTD., Suwon-si (KR)

(72) Inventors: Sungsoo Kim, Suwon-si (KR); Seyoon Bae, Suwon-si (KR); Byoungryoul Song, Suwon-si (KR); Seungbum Choi, Suwon-si (KR); Wonjoon Choi, Suwon-si (KR); Joon Heo, Suwon-si (KR); Seongjin Park, Suwon-si (KR); Sumin Yun, Suwon-si (KR); Jaehoon Jo, Suwon-si (KR); Woosung Chun, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 151 days.

(21) Appl. No.: 18/201,382

(22) Filed: May 24, 2023

(65) Prior Publication Data
US 2023/0327337 A1     Oct. 12, 2023

Related U.S. Application Data

(63) Continuation of application No. PCT/KR2021/016182, filed on Nov. 9, 2021.

(30) Foreign Application Priority Data

Nov. 24, 2020 (KR) ........................ 10-2020-0159059

(51) Int. Cl.
*H01Q 1/24* (2006.01)
*H01Q 9/04* (2006.01)
*H01Q 21/06* (2006.01)

(52) U.S. Cl.
CPC ........... *H01Q 9/0407* (2013.01); *H01Q 1/241* (2013.01); *H01Q 21/065* (2013.01)

(58) Field of Classification Search
CPC ........... H01Q 1/40; H01Q 1/44; H01Q 1/236; H01Q 1/241; H01Q 1/243; H01Q 9/0407;
(Continued)

(56) References Cited

U.S. PATENT DOCUMENTS 8,395,553 B2    3/2013  Oh
9,250,613 B2    2/2016  Jenwatanavet et al.
(Continued)

FOREIGN PATENT DOCUMENTS

KR    20070074714 A    7/2007
KR    20150031065 A    3/2015
(Continued)

OTHER PUBLICATIONS

International Search Report and Written Opinion for International Application No. PCT/KR2021/016182; International Filing Date Nov. 9, 2021; Date of Mailing Mar. 8, 2022; 88 Pages.
(Continued)

*Primary Examiner* — Tung X Le
(74) *Attorney, Agent, or Firm* — CANTOR COLBURN LLP

(57) ABSTRACT

An electronic apparatus having a housing, a flexible display, and a key button which is arranged in a first area on a side of a first part is provided. The key button includes at least one protrusion extending toward the inside of the first part and an antenna structure arranged on the inside of the first part with respect to the first area. The housing includes the first part, a second part, and a connection part arranged between the first part and the second part, the second part being rotatably coupled to the first part through the connection part. The antenna structure includes a dome switch
(Continued)

arranged above a substrate at a position corresponding to the at least one protrusion, and a plurality of conductive patches provided on a conductive layer of the substrate. The dome switch may be arranged at the corresponding position between the plurality of conductive patches.

20 Claims, 41 Drawing Sheets

(58) Field of Classification Search
CPC .. H01Q 9/0414; H01Q 9/0421; H01Q 9/0464; H01Q 21/08; H01Q 21/28; H01Q 21/065
See application file for complete search history.

(56) References Cited

U.S. PATENT DOCUMENTS

| | | | |
|---|---|---|---|
| 10,243,606 B1 | 3/2019 | Miehl et al. | |
| 11,800,667 B2 | 10/2023 | Oh et al. | |
| 11,923,600 B2* | 3/2024 | Asrani | H01Q 21/08 |
| 2008/0074329 A1 | 3/2008 | Caballero et al. | |
| 2010/0331050 A1 | 12/2010 | Tahk et al. | |
| 2011/0255260 A1 | 10/2011 | Weber et al. | |
| 2014/0367237 A1* | 12/2014 | Taylor | H01H 15/06 200/5 A |
| 2016/0233037 A1 | 8/2016 | Lee et al. | |
| 2017/0033812 A1 | 2/2017 | Son et al. | |
| 2019/0096610 A1* | 3/2019 | Kanemaki | H01H 23/06 |
| 2019/0229413 A1 | 7/2019 | Jong et al. | |
| 2021/0328329 A1 | 10/2021 | Kim et al. | |
| 2021/0400802 A1 | 12/2021 | Kim et al. | |
| 2022/0069443 A1 | 3/2022 | Jeon et al. | |

FOREIGN PATENT DOCUMENTS

| | | |
|---|---|---|
| KR | 101552155 B1 | 9/2015 |
| KR | 20160020497 A | 2/2016 |
| KR | 20160097102 A | 8/2016 |
| KR | 20170013682 A | 2/2017 |
| KR | 20190003031 U | 12/2019 |
| KR | 20200025439 A | 3/2020 |
| KR | 20200057962 A | 5/2020 |
| KR | 20200072190 A | 6/2020 |
| KR | 20200092719 A | 8/2020 |
| KR | 20200121199 A | 10/2020 |
| WO | 2017018793 A1 | 2/2017 |
| WO | 2020122598 A1 | 6/2020 |
| WO | 2020153694 A1 | 7/2020 |

OTHER PUBLICATIONS

Extended European Search Report corresponding to Application No. EP21898424.3; Issue Date: Mar. 22, 2024.
Korean Office Action Issued In KR Application No. 10-2020-0159059; Mail Date Jan. 2, 2025; 11 Pages.

* cited by examiner (1401)

(1402)

(1403)

(1404)

ELECTRONIC APPARATUS COMPRISING ANTENNA

CROSS-REFERENCE TO RELATED APPLICATION(S

This application is a continuation application, claiming priority under § 365(c), of International Application No. PCT/KR2021/016182 filed on Nov. 9, 2021, which is based on and claims the benefit of Korean patent application number 10-2020-0159059, filed on Nov. 24, 2020, in the Korean Intellectual Property Office, the disclosures of which are incorporated by reference herein in their entireties.

TECHNICAL FIELD

Various embodiments relate to an electronic device including an antenna.

BACKGROUND

With the development of communication devices, electronic devices include an antenna module capable of fast and high-capacity transmission for the production and transmission of various contents, Internet connection with various things (e.g., Internet of Things (IoT)), or communication connection between various sensors for autonomous driving. For example, the electronic device may include an antenna module configured to radiate mm Wave signals (hereinafter, referred to as a "mmWave antenna module").

The mmWave antenna module may be disposed to be adjacent to the outer periphery of the housing of the electronic device in consideration of spherical coverage. For example, the electronic device may include two mmWave antenna modules disposed on the side surface of the housing to form a beam toward the side surface. As another example, an electronic device may include one mmWave antenna module disposed on the side surface of the housing thereof to form a beam toward the side surface, and one mmWave antenna module disposed on the rear surface of the housing to form a beam toward the rear surface.

Meanwhile, in consideration of the characteristics of a beam formed from a mmWave antenna module, a housing around the mmWave antenna module may include a conductive material and/or a non-conductive material. For example, an mmWave antenna module disposed on the side surface of the housing may be surrounded by a rear surface cover made of glass and a side surface metal member. The rear surface cover may be bent and extended from the rear surface of the housing to a portion of the side surface.

Various components such as a volume key, biometric sensors (e.g., a fingerprint recognition sensor), a subscriber identification module (SIM) slot, and a legacy antenna (e.g., an antenna for wireless communication of 4G or less) may be placed on the side surface of an electronic device. For this reason, there are spatial restrictions for arranging mmWave antenna modules in an electronic device, and it may be difficult to ensure spherical coverage required to smoothly perform wireless communication.

In order to properly shape a beam pattern formed from a mmWave antenna module, a certain portion of the mmWave antenna module needs to be covered by a metal member and a non-metal member. A rear surface cover that is made of glass and bent and extended from the rear surface to the side surface may have limitations in design to satisfy required beam characteristics, and the rear surface cover having a complicated shape may have problems in terms of processing difficulty and yield degradation.

SUMMARY

According to various embodiments, an electronic device may include a housing, a flexible display defining at least a portion of a front surface of the electronic device in a state in which the housing is unfolded, wherein the flexible display is disposed over the first part and the second part, a key button disposed in a first area of a side surface of the first part, wherein the key button includes at least one protrusion extending toward inside of the first part, and an antenna structure disposed in the inside of the first part with respect to the first area. The housing may include the first part, the second part, and a connecting portion disposed between the first part and the second part, and the second part is rotatably connected to the first part via the connecting portion. The antenna structure may include a substrate including multiple layers in which a conductive layer and a non-conductive layer are alternately stacked, at least one dome switch disposed above the substrate at a position corresponding to the at least one protrusion, and a plurality of conductive patches provided in the conductive layer of the substrate. The at least one dome switch may be disposed at a position corresponding to a space between adjacent ones of the plurality of conductive patches.

According to various embodiments, an electronic device may include a housing, a flexible display defining at least a portion of the front surface of the housing, a key button disposed in a first area of a side surface of the housing, wherein the key button includes at least one protrusion extending toward inside of the housing, and an antenna structure disposed in the inside of the housing with respect to the first area. The antenna structure may include a substrate including multiple layers in which a conductive layer and a non-conductive layer are alternately stacked, at least one dome switch disposed above the substrate at a position corresponding to the at least one protrusion, and plurality of conductive patches provided in the conductive layer of the substrate. The at least one dome switch may be disposed at a position corresponding to a space between the plurality of conductive patches.

In an electronic device according to an embodiment, it is possible to arrange an antenna structure without restriction of an arrangement space and to ensure wide spherical coverage through a key button assembly including the antenna structure.

In an electronic device according to an embodiment, the shape of a rear surface cover can be simplified, and the degree of freedom in design and the yield of the rear surface cover can be improved.

BRIEF DESCRIPTION OF DRAWINGS

The above and other aspects, features, and advantages of certain embodiments of the disclosure will be more apparent from the following description taken in conjunction with the accompanying drawings, in which.

DETAILED DESCRIPTION

Figure 1A:
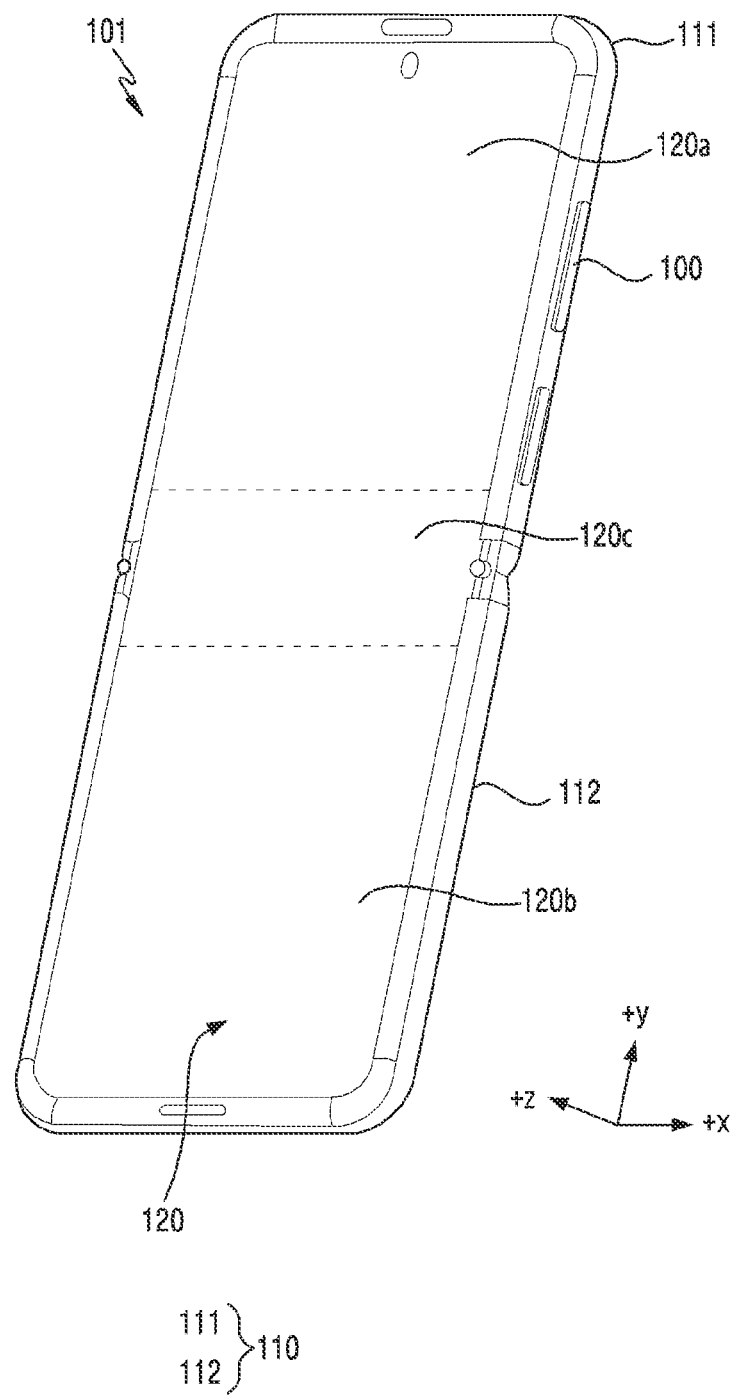
FIG. 1A is a perspective view illustrating an electronic device according to an embodiment in an unfolded state.

FIG. 1A is a perspective view illustrating an electronic device according to an embodiment in an unfolded state.

Figure 1B:
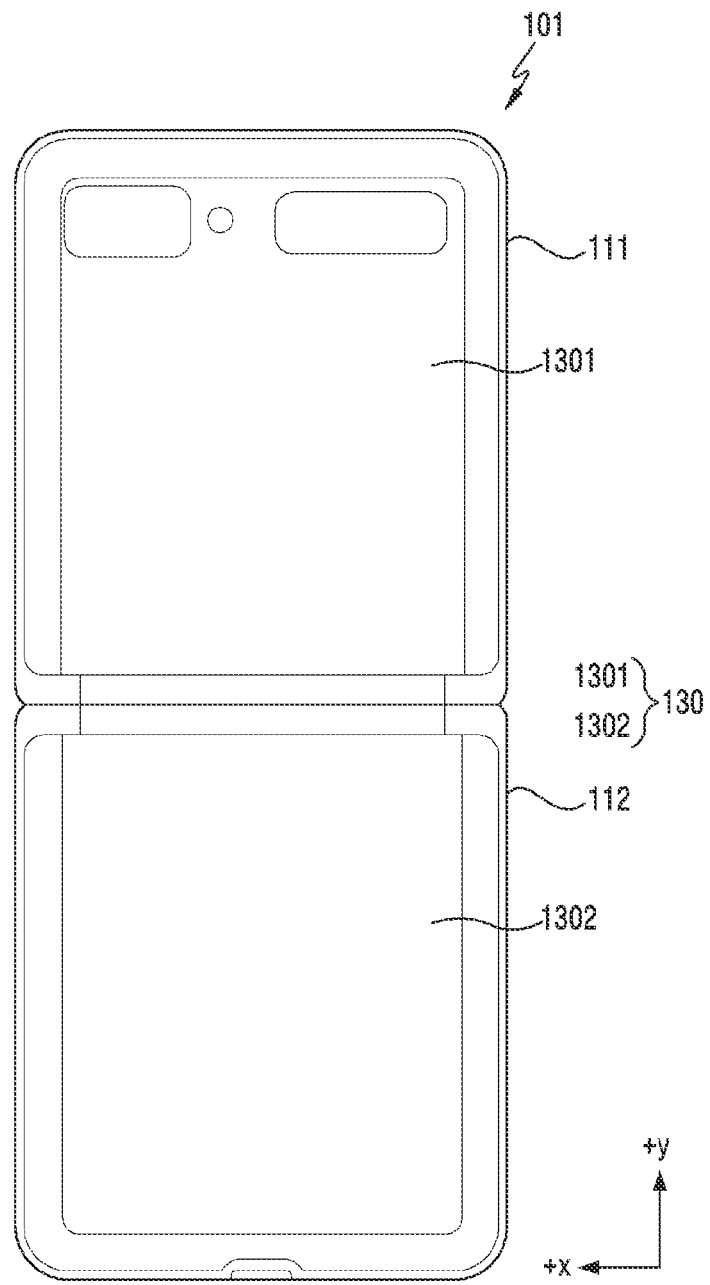
FIG. 1B is a rear view of the electronic device according to an embodiment in the unfolded state.

FIG. 1B is a rear view of the electronic device according to an embodiment in the unfolded state.

Figure 1C:
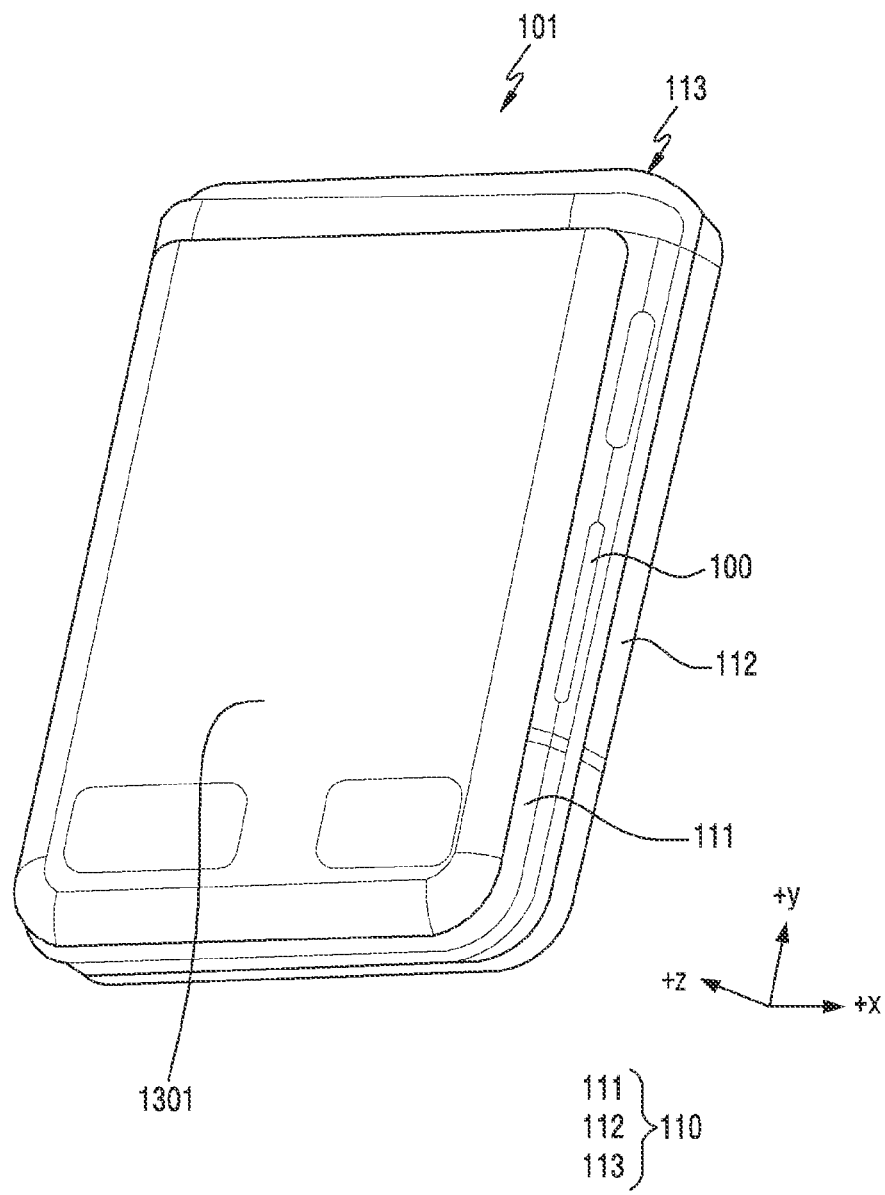
FIG. 1C is a perspective view illustrating the electronic device according to an embodiment in a folded state.

FIG. 1C is a perspective view illustrating the electronic device according to an embodiment in a folded state.

Figure 2:
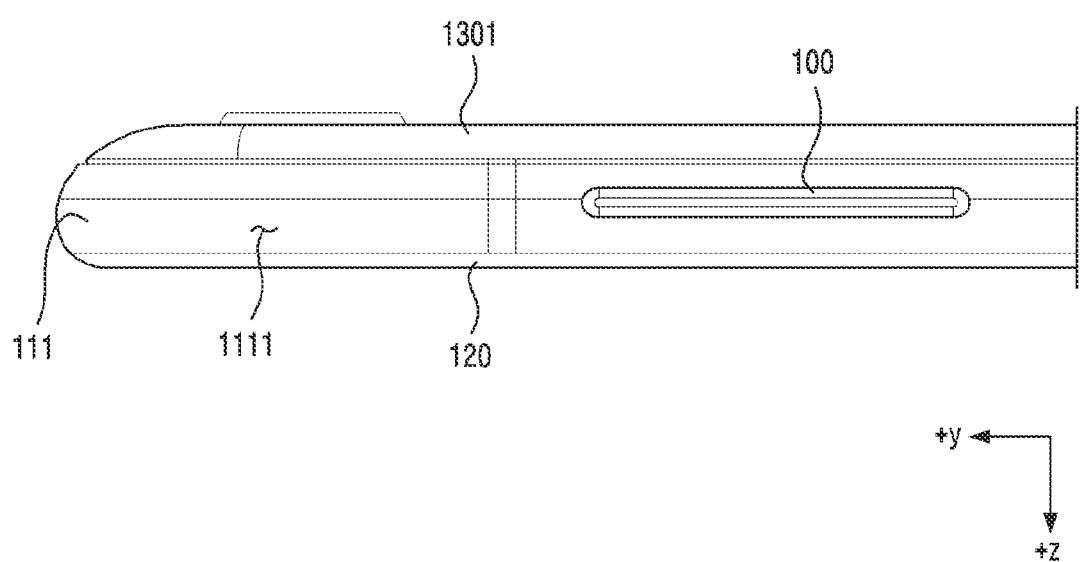
FIG. 2 is a side view illustrating a portion of the electronic device according to an embodiment.

FIG. 2 is a side view illustrating a portion of the electronic device according to an embodiment.

Referring to FIGS. 1A, 1B, 1C, and 2, an electronic device 101 (e.g., the electronic device 1501 of FIG. 15) according to an embodiment may include a foldable housing 110 (or a housing 110), a flexible display 120 (or a display 120), a connecting portion 113, a cover 130 (or a rear surface cover 130), and a key button assembly 100.

In an embodiment, the foldable housing 110 may include a first part 111 and a second part 112. In an embodiment, the first part 111 and the second part 112 may define a space in which electronic components (e.g., a printed circuit board, a battery, a processor, and the like) of the electronic device 101 may be disposed. The electronic components may be disposed inside the first part 111 and/or the second part 112.

In an embodiment, the first part 111 may be coupled to the connecting portion 113 to be rotatable about the second part 112. The second part 112 may be coupled to the connecting portion 113 to be rotatable about the first part 111. For example, the first part 111 and the second part 112 may be arranged side by side when the electronic device 101 is in the unfolded state (FIG. 1A). As another example, when the electronic device 101 is in the folded state (FIG. 1C), the first part 111 may rotate (or turn) about the second part 112 so that one surface of the first part 111 and one surface of the second part 112 may face each other.

According to an embodiment, the first part 111 and the second part 112 may define a recess accommodating the flexible display 120, and the flexible display 120 may be seated in the recess to be supported by the first part 111 and the second part 112. The first part 111 and the second part 112 may be made of a metal material and/or a non-metal material having predetermined rigidity to support the flexible display 120.

According to an embodiment, the flexible display 120 may be disposed on the first part 111 and the second part 112. When the electronic device 101 is in the unfolded state, the flexible display may define at least a portion of the front surface (e.g., the surface in the +z direction in FIG. 1A) of the electronic device 101 may be formed.

In an embodiment, the flexible display 120 may extend from one area of the first part 111 to at least one area of the second part 112 across the connecting portion 113. In an embodiment, the flexible display 120 may include a first area 120a corresponding to the first part 111, a second area 120b corresponding to the second part 112, and a third area 120c corresponding to a connecting portion 113. The third area 120c may be located between the first area 120a and the second area 120b. In an embodiment, the third area 120c may have a flexible characteristic so that the flexible display 120 can be deformed in response to a folding operation of the foldable housing 110. However, the disclosure is not limited to the above-described embodiment, and according to an embodiment, all of the first area 120a, the second area 120b, and the third area 120c of the flexible display 120 may have the flexible characteristic.

In an embodiment, when the electronic device 101 is in the unfolded state, the first area 120a, the second area 120b, and the third area 120c may be placed side by side to face the same direction (e.g., the +y direction of FIG. 1A). In an embodiment, when the electronic device 101 is in the unfolded state, the first area 120a, the second area 120b, and the third area 120c may define a single plane (e.g., the x-y plane of FIG. 1A).

In an embodiment, when the electronic device 101 is in the folded state, the third area 120c may be bent depending on the angle at which the foldable housing 110 is folded, and the first area 120a and the second area 120b may face each other.

According to an embodiment, the connecting portion 113 may interconnect the first part 111 and the second part 112. The connecting portion 113 may rotate the second part 112 within a predetermined rotating range relative to the first part 111 or, conversely, rotate the first part 111 within a predetermined rotation range relative to the second part 112. In an embodiment, the connecting portion 113 may include at least one hinge structure.

In an embodiment, the connecting portion 113 may be visible from outside the electronic device 101 or may be covered by the foldable housing 110 depending on the folded or unfolded state of the electronic device 101. For example, referring to FIG. 1B, when the electronic device 101 is in the unfolded state, the connecting portion 113 may be covered by the foldable housing 110 and may be invisible from outside the electronic device 101. As another example, referring to FIG. 1C, when the electronic device 101 is in the folded state, the connecting portion 113 may be visible from outside the electronic device 101 by rotation of the first part 111 and the second part 112.

In an embodiment, the cover 130 may include a first cover 1301 included in the first part 111, and a second cover 1302 included in the second part 112. In an embodiment, the cover 130 may be disposed under the first part 111 and the second part 112 (e.g., in the −z direction of FIG. 1A). For example, the first cover 1301 may be disposed under the first part 111, and the second cover 1302 may be disposed under the second part 112. In an embodiment, the cover 130 may define at least a portion of the rear surface of the electronic device 101 (e.g., the surface facing the −z direction in FIG. 1A).

In an embodiment, the key button assembly 100 may be disposed in the first part 111 of the electronic device 101. For example, referring to FIG. 2, the first part 111 may include an opening in the side surface 1111, and the key button assembly 100 may be disposed in the first part 111 by being at least partially inserted into the opening. In an embodiment, the side surface 1111 of the first part 111 may include a curved surface. The position where the key button assembly 100 is disposed in the side surface 1111 of the first part 111 is not limited by the example illustrated in FIG. 2. Examples of positions where the key button assembly 100 may be disposed in the side surface 1111 of the first part 111 will be described later with reference to FIG. 14.

Figure 3:
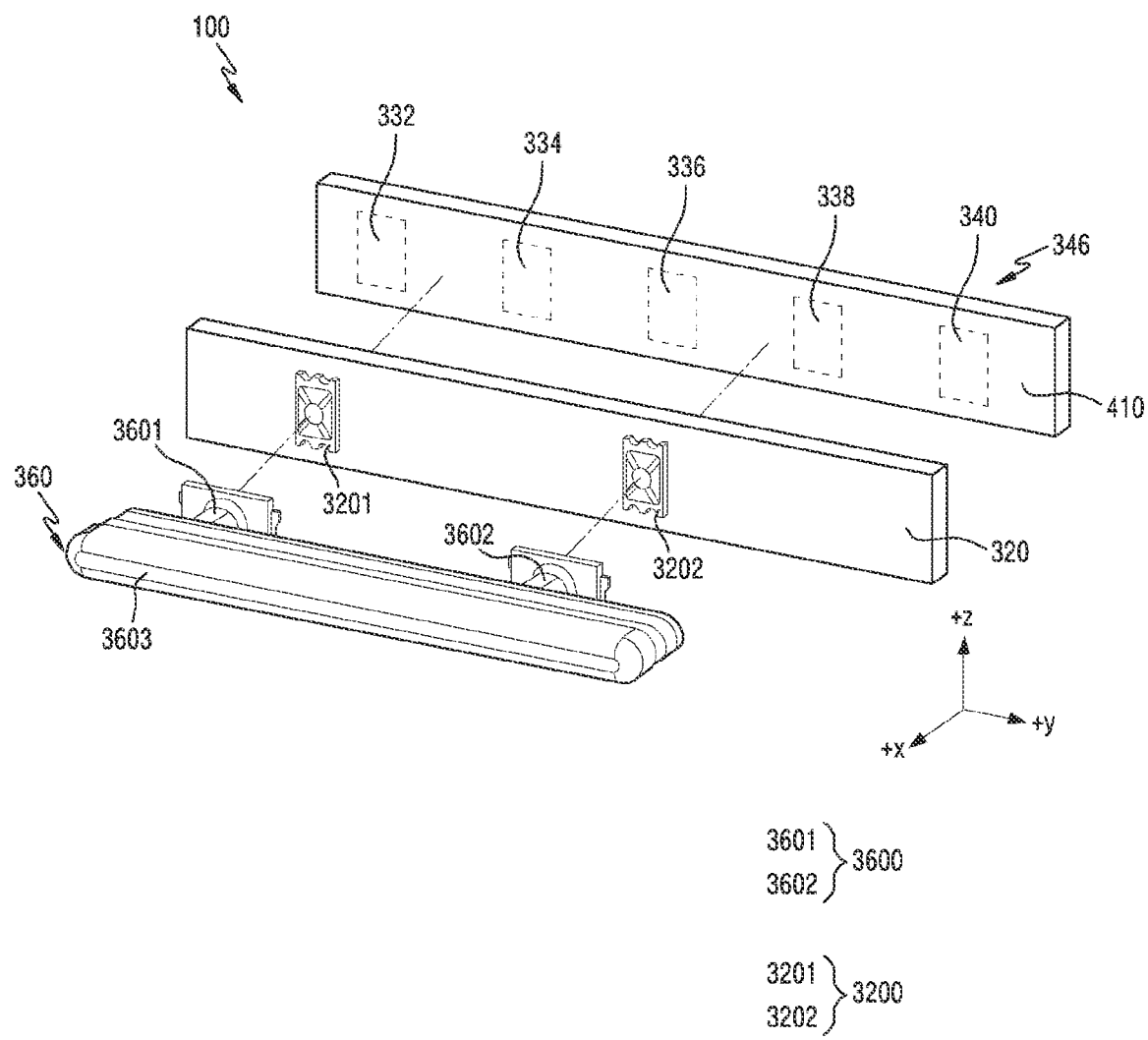
FIG. 3 is a disassembled perspective view of a key button assembly according to an embodiment.

FIG. 3 is a disassembled perspective view of the key button assembly 100 according to an embodiment.

Referring to FIG. 3, the key button assembly 100 according to an embodiment may include a key button 360, a first substrate 320, at least one dome switch 3200, and an antenna structure 346. For example, the antenna structure includes at least one antenna or at least one antenna element.

In an embodiment, the key button 360 may include a body 3603 and at least one protrusion 3600.

In an embodiment, the body 3603 may extend in a longitudinal direction (e.g., the y-axis direction). At least a portion of the body 3603 may be visible from outside the electronic device 101 in a state where the key button assembly 100 is disposed in the first part 111. At least a portion of the body 3603 may define a portion of the side surface of the electronic device 101 (e.g., the side surface 1111 of the first part 111 of FIG. 2). In an embodiment, at least a portion of the body 3603 may protrude outside the first part 111 (e.g., in the +x direction of FIG. 1C) while being disposed on the first part 111.

In an embodiment, the at least one protrusion 3600 may extend from the body 3603 in a direction (e.g., the −x direction) substantially perpendicular to the longitudinal direction of the body 3603. The at least one protrusion 3600 may extend from the body 3603 to the inside of the first part 111 (e.g., in the −x direction of FIG. 1A) in a state where the key button assembly 100 is disposed in the first part 111.

In an embodiment, the at least one protrusion 3600 may include a first protrusion 3601 and a second protrusion 3602. The first protrusion 3601 may be disposed adjacent to one end of the body 3603, and the second protrusion 3602 may be disposed adjacent to the other end of the body 3603. For example, the first protrusion 3601 may be disposed closer to the one end than the other end of the body 3603, and the second protrusion 3602 may be disposed closer to the other end than the one end of the body 3603.

In an embodiment, the first substrate 320 may be disposed under the key button 360 (e.g., in the −x direction). The first substrate 320 may have a predetermined thickness and a predetermined width and may extend in a longitudinal direction (e.g., the y-axis direction). The first substrate 320 may include a dielectric material (or a dielectric layer) having a predetermined permittivity.

In an embodiment, the at least one dome switch 3200 may be disposed on the first substrate 320. In an embodiment, the at least one dome switch 3200 may be disposed between the key button 360 and the first substrate 320. In an embodiment, the at least one dome switch 3200 may be disposed on the first substrate 320 at a position corresponding to the positions of the at least one protrusion 3600 of the key button 360. For example, when viewed in the x-axis direction, the at least one dome switch 3200 may overlap the at least one protrusion 3600. For example, when viewed in the x-axis direction, the at least one dome switch 3200 may be disposed on the first substrate 320 to face the at least one protrusion 3600. For example, the at least one dome switch 3200 may be aligned with the at least protrusion 3600 in a straight line with respect to the x-axis. In an embodiment, the at least one dome switch 3200 may include a first dome switch 3201 and a second dome switch 3202. The first dome switch 3201 may correspond to the first protrusion 3601, and the second dome switch 3202 may correspond to the second protrusion 3602.

In an embodiment, the at least one dome switch 3200 may include a conductive material such as metal and may be electrically connected to a printed circuit board of the electronic device 101. For example, the at least one dome switch 3200 may be connected to a first contact (e.g., a ground) having a relatively low voltage level and a second contact having a relatively high voltage level on the printed circuit board. A first portion of the at least one dome switch 3200 may be electrically connected to the first contact, and a second portion of the one or more dome switch 3200 may be selectively connected to the second contact. When a user pushes the key button 360, the second portion of the at least one or more dome switch 3200 is pressed by at least one protrusion (e.g., the first protrusion 3601) to be electrically connected to the second contact. When the user pushes the key button 360, a closed circuit that generates an electrical signal (or current flow) may be formed between the at least one dome switch 3200 and the printed circuit board of the electronic device 101 (or between the first contact and the second contact). An electrical signal generated by the at least one dome switch 3200 may be provided to a processor (e.g., the processor 1520 of FIG. 15) of the electronic device 101, and the processor executes a predetermined function based on the electrical signal. For example, in response to a first signal generated when the first dome switch 3201 is pressed, the processor may increase the output level of audio data provided to a sound output module (e.g., the sound output module 1555 of FIG. 15), and in response to a second signal generated when the second dome switch 3202 is pressed, the output level of audio data provided to the sound output module may be decreased. In another embodiment, the at least one protrusion 3600 and the at least one dome switch 3200 may include only one protrusion and only one dome switch, respectively. In this case, the single dome switch may operate as a switch for controlling the power of the electronic device 101. However, the function of the at least one dome switch 3200 is not limited by the above example.

In an embodiment, the antenna structure 346 may be disposed under the first substrate 320 (e.g., in the −x direction). In an embodiment, the antenna structure 346 may include a second substrate 410 and a plurality of conductive patches 332, 334, 336, 338, and 340. In an embodiment, the plurality of conductive patches 332, 334, 336, 338, and 340 may be disposed inside or on the second substrate 410. In an embodiment, the plurality of conductive patches 332, 334, 336, 338, and 340 may be spaced apart from each other. In an embodiment, the plurality of conductive patches 332, 334, 336, 338, and 340 may be arranged in a line along a direction in which the second substrate 410 extends (e.g., the y-axis direction). For example, the direction in which the plurality of conductive patches 332, 334, 336, 338, and 340 are arranged may be substantially the same as the direction in which the key button 360 extends.

In an embodiment, the at least one dome switch 3200 may be located to correspond to an area in which the plurality of conductive patches 332, 334, 336, 338, and 340 are spaced apart from each other. For example, the first dome switch 3201 may be disposed between the first conductive patch 332 and the second conductive patch 334 when the key button assembly 100 is viewed in the −x direction. As another example, the second dome switch 3202 may be disposed between the fourth conductive patch 338 and the fifth conductive patch 340 when the key button assembly 100 is viewed in the −x direction. In an embodiment, the at least one dome switch 3200 may not overlap the plurality of conductive patches 332, 334, 336, 338, and 340 when the key button assembly 100 is viewed in the −x direction.

In another embodiment, the first substrate 320 and the second substrate 410 may be integrated. In another embodiment, the first substrate 320 and the second substrate 410 may be fabricated as separate substrates, and the first substrate 320 and the second substrate 410 may be bonded to each other to be integrated.

Figure 4A:
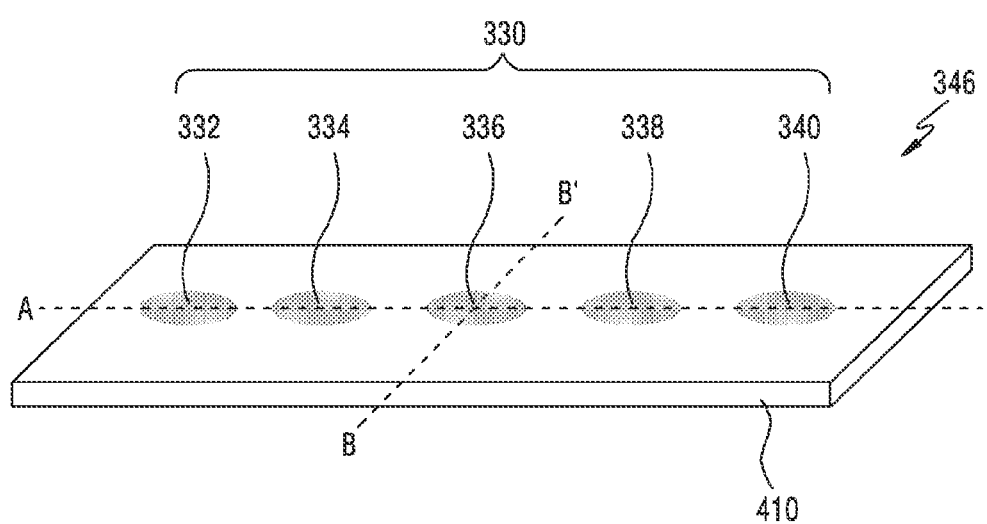
FIG. 4A illustrates an antenna structure according to an embodiment.
Figure 4B:
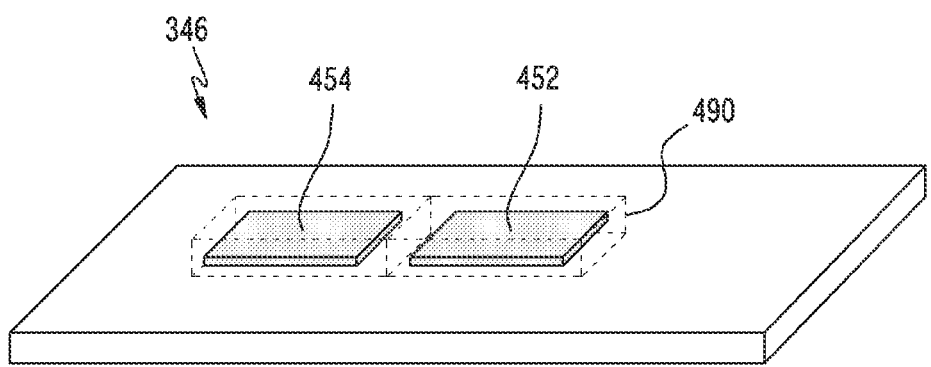
FIG. 4B illustrates an antenna structure according to an embodiment.
Figure 4C:
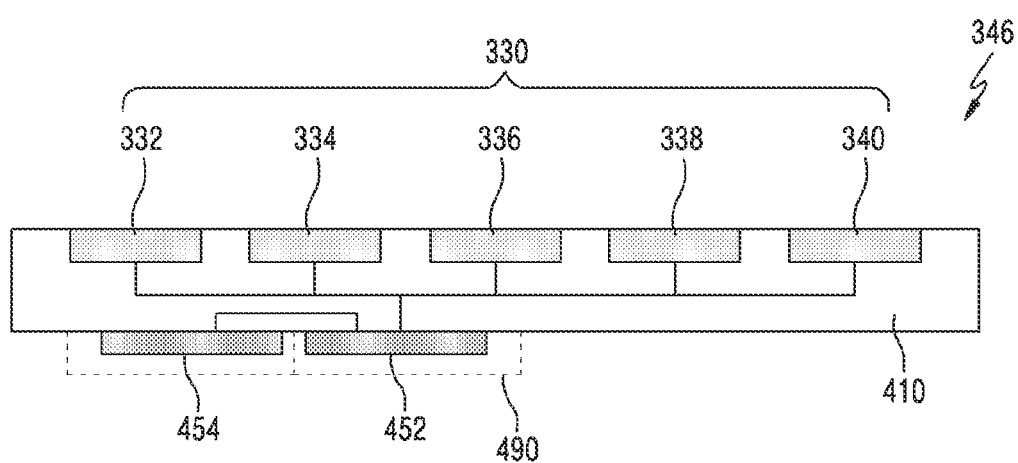
FIG. 4C illustrates an antenna structure according to an embodiment.

FIGS. 4A, 4B, and 4C illustrate an antenna structure 346 according to an embodiment. FIG. 4A is a perspective view of the antenna structure 346 according to an embodiment viewed from one side, and FIG. 4B is a perspective view of the antenna structure 346 according to an embodiment viewed from the other side. FIG. 4C is a cross-sectional view of the antenna structure 346 according to an embodiment taken along line A-A'.

Referring to FIGS. 4A, 4B, and 4C, in an embodiment, the antenna structure 346 may include a second substrate 410, an antenna array 330, a radio frequency integrated circuit (RFIC) 452, and a power manage integrated circuit (PMIC) 454. Optionally, the antenna structure 346 may further include a shield member 490. In another embodiment, at least one of the above-mentioned components may be omitted, or at least two of the components may be integrated.

In an embodiment, the second substrate 410 may include a printed circuit board including multiple conductive layers and multiple non-conductive layers which are alternately stacked with the conductive layers. The first substrate 410 may provide an electrical connection between various electronic components disposed on the second substrate 410 and/or outside the second substrate 410 by using wiring lines and conductive vias provided in the conductive layers.

In an embodiment, the antenna array 330 may include a plurality of conductive patches 332, 334, 336, 338, and 340. The plurality of conductive patches 332, 334, 336, 338, and 340 may operate as antenna elements for forming a directional beam. As illustrated, the plurality of conductive patches 332, 334, 336, 338, and 340 may be provided on a first surface of the second substrate 410. The first surface of the second substrate 410 may be a surface facing the first substrate 320 of FIG. 3. In another embodiment, the plurality of conductive patches 332, 334, 336, 338, and 340 may be provided inside the second substrate 410. According to an embodiment, the antenna array 330 may include multiple antenna arrays, which are different or the same in shape or type (e.g., a dipole antenna array and/or a patch antenna array).

In an embodiment, the RFIC 452 may be disposed in another area (e.g., a second surface opposite to the first surface) of the second substrate 410 spaced apart from the antenna array 330. The RFIC 452 may be configured to process signals of a selected frequency band transmitted and/or received via the antenna array 330. According to an embodiment, during transmission, the RFIC 452 may convert a baseband signal acquired from a communication processor (not illustrated) into an RF signal of a predetermined band. During reception, the RFIC 452 may convert an RF signal received via the antenna array 330 into a baseband signal and provide the baseband signal to the communication processor.

According to another embodiment, during transmission, the RFIC 452 may up-convert an IF signal (of, e.g., about 9 GHz to about 11 GHz) acquired from an intermediate frequency integrated circuit (IFIC) into an RF signal of a selected band. During reception, the RFIC 452 may down-convert an RF signal acquired via the antenna array 330 into an IF signal and transmit the IF signal to the IFIC.

According to an embodiment, the PMIC 454 may be disposed in another partial area (e.g., the second surface) of the second substrate 410 spaced apart from the antenna array 330. The PMIC 454 may receive voltage from a main printed circuit board (not illustrated) of the electronic device 101 and may provide the necessary power to various components (e.g., the RFIC 452) of the antenna structure 346.

According to an embodiment, the shield member 490 may be disposed on a portion (e.g., the second surface) of the second substrate 410 to electromagnetically shield at least one of the RFIC 452 or the PMIC 454. For example, the shield member 490 may be disposed on the second surface of the second substrate 410 to cover the RFIC 452 and/or the PMIC 454. In an embodiment, the shield member 490 may include an encapsulant such as an epoxy molding compound (EMC) or a shield can, but is not limited thereto.

Although not illustrated, in various embodiments, the antenna structure 346 may be electrically connected to another printed circuit board (e.g., a main printed circuit board) via a module interface. The module interface may include a connecting member, such as a coaxial cable connector, a board-to-board connector, an interposer, or a flexible printed circuit board (FPCB). Via the connecting member, the RFIC 452 and/or the PMIC 454 of the antenna module may be electrically connected to the printed circuit board.

Figure 5A:
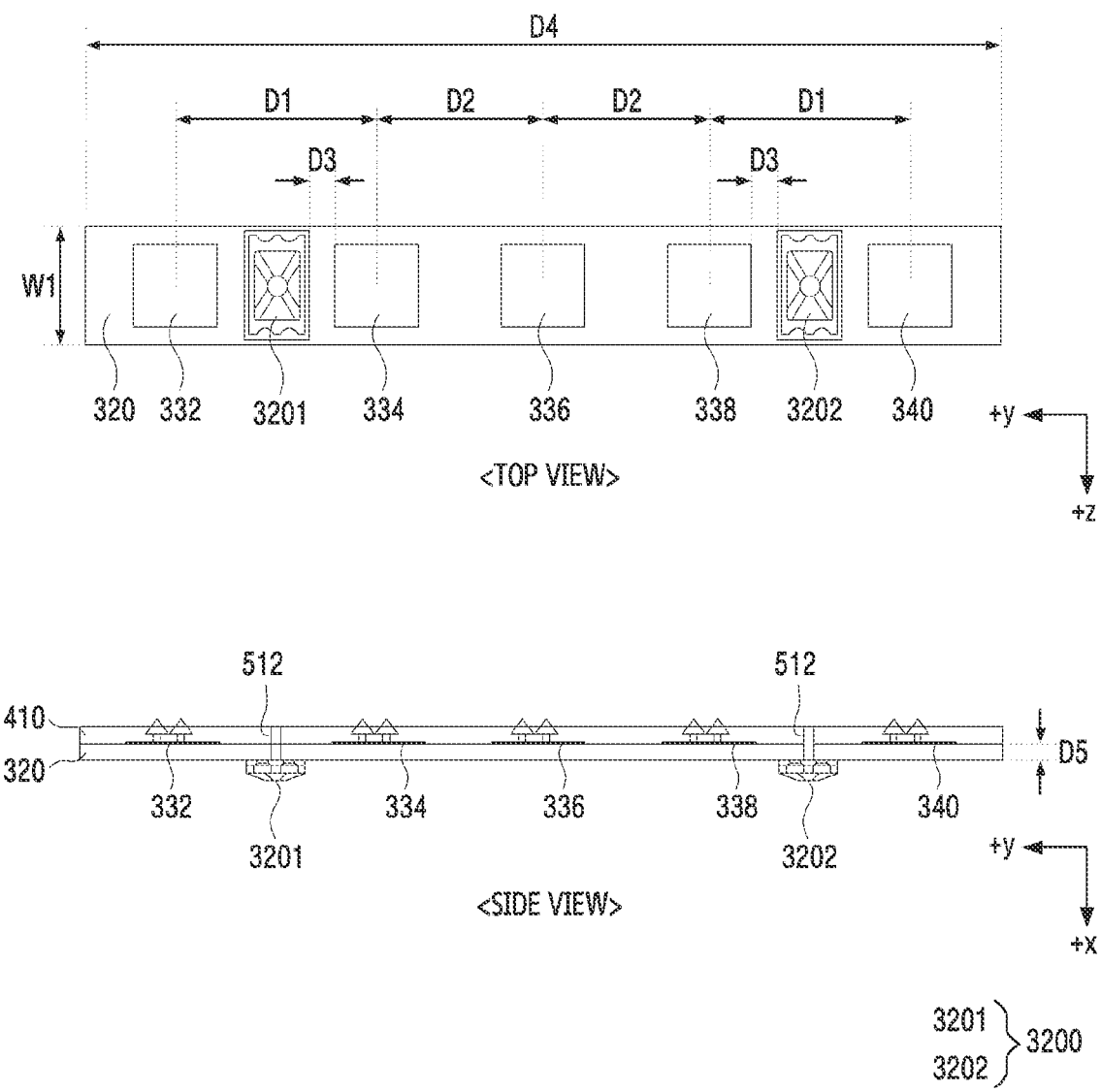
FIG. 5A illustrates a first substrate and a second substrate on which dome switches according to an embodiment are disposed.

FIG. 5A illustrates the first substrate and the second substrate on which dome switches according to an embodiment are disposed.

Figure 5B:
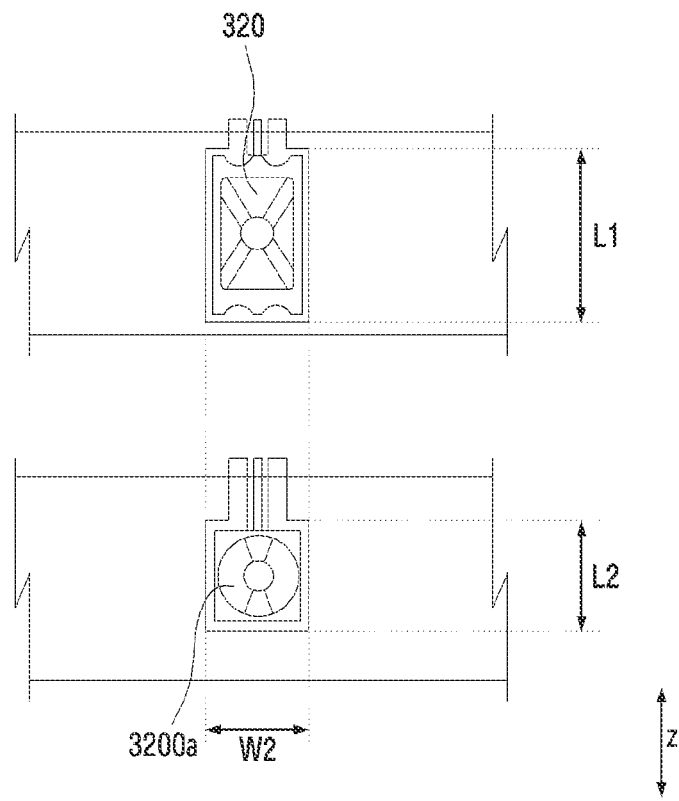
FIG. 5B illustrates examples of shapes of dome switches according to an embodiment.

FIG. 5B illustrates examples of shapes of dome switches according to an embodiment.

Figure 5C:
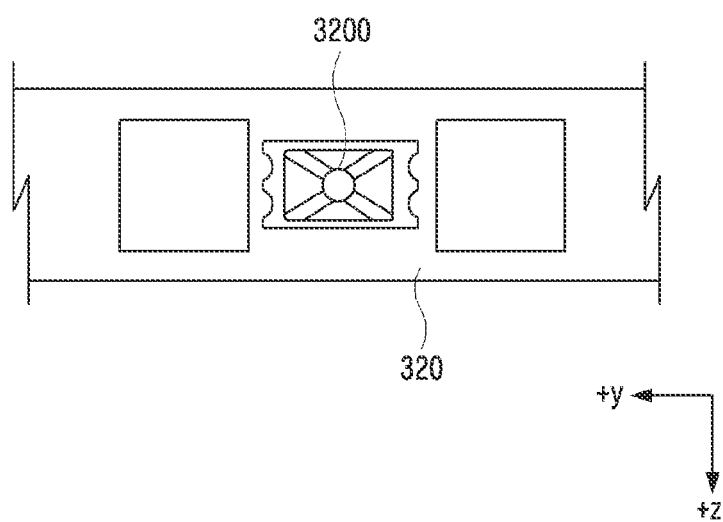
FIG. 5C illustrates an example in which a dome switch according to an embodiment is arranged in another direction.

FIG. 5C illustrates an example in which a dome switch according to an embodiment is arranged in another direction.

In FIGS. 5A, 5B, and 5C, redundant descriptions of components having the same reference numerals as those described above are omitted.

Referring to FIG. 5A, the first conductive patch 332 and the second conductive patch 334 may be spaced apart by a first predetermined distance D1. The first predetermined distance D1 may be about 5.7 mm, but is not limited thereto. In an example, the first predetermined distance D1 may be changed depending on the thickness of the first substrate 320 or the thickness of the at least one dome switch 3200. Hereinafter, a second predetermined distance D2, a third predetermined distance D3, a fourth predetermined distance D4, or a fifth predetermined distance D5 may also be changed depending on the thickness of the first substrate 320 or the thickness of the at least one dome switch 3200.

According to an embodiment, the first dome switch 3201 may be disposed to correspond to an area where the first conductive patch 332 and the second conductive patch 334 are spaced apart from each other. For example, the first dome switch 3201 may be disposed between the first conductive patch 332 and the second conductive patch 334 when the first substrate 320 is viewed from above. In an embodiment, the first dome switch 3201 may be spaced apart from the first conductive patch 332 and the second conductive patch 334 by the third predetermined distance D3.

In an embodiment, the second conductive patch 334, the third conductive patch 336, and the fourth conductive patch 338 may be spaced apart from each other by the second predetermined distance D2. The second predetermined distance D2 may be about 4.7 mm, but is not limited thereto.

In an embodiment, the fourth conductive patch 338 and the fifth conductive patch 340 may be spaced apart from each other by the first predetermined distance D1. In an embodiment, the second dome switch 3202 may be disposed to correspond to an area where the fourth conductive patch 338 and the fifth conductive patch 340 are spaced apart from each other. For example, the second dome switch 3202 may be disposed between the fourth conductive patch 338 and the fifth conductive patch 340 when the first substrate 320 is viewed from above. In an embodiment, the second dome switch 3202 may be spaced apart from the fourth conductive patch 338 and the fifth conductive patch 340 by the third predetermined distance D3. Since the first dome switch 3201 and the second dome switch 3202 are spaced apart from the conductive patches with reference to the y-axis, it is possible to prevent beam patterns radiating from the conductive patches from tilting. The third predetermined distance D3 may be about 1.25 mm, but is not limited thereto.

In an embodiment, the first substrate 320 may have a fifth predetermined distance D5. The fifth predetermined distance D5 may be, for example, about 0.5 mm, but is not limited thereto. In an embodiment, the at least one dome switch 3200 may be spaced apart from the conductive patches 332, 334, 336, 338, and 340 by the distance D5 with respect to the x-axis by the first substrate 320. In an embodiment, the fifth predetermined distance D5 and/or permittivity of the first substrate 320 may be appropriately configured depending on the required radiation pattern of the conductive patches. The fifth predetermined distance D5 of the first substrate 320 may substantially mean the thickness of the first substrate 320.

In an embodiment, the first substrate 320 and the second substrate 410 may extend in the y-axis direction may have a predetermined width W1 and a predetermined fourth distance D4. The predetermined width W1 may be, for example, 3.5 mm or more and 4.2 mm or less, but is not limited thereto. The fourth predetermined distance D4 may be, for example, about 26 mm, but is not limited thereto.

Referring to FIG. 5B, the at least one dome switch 3200 according to an embodiment may have a rectangular shape having a predetermined width W2 and a predetermined length L1, which is greater than the predetermined width W2. In another embodiment, the at least one dome switch 3200a may have a square shape having a predetermined width W2 and a length L2 equal to the predetermined width W2. The predetermined width W2 may be about 1.6 mm, but is not limited thereto. The predetermined length L1 may be about 2.8 mm, but is not limited thereto. The predetermined length L2 may be about 1.6 mm, but is not limited thereto.

In an embodiment, the at least one square dome switch 3200a may have shorter edges than the at least one rectangular dome switch 3200 with respect to the z-axis. In FIG.

5A, when it is assumed that signals emitted from the conductive patches 332, 334, 336, 338, and 340 in FIG. 5A have a vertical polarization characteristic parallel to the z-axis direction, the at least one square dome switch 3200a may have a smaller effect on the radiation performance of a signal having the vertical polarization characteristic than the at least one rectangular dome switch 3200.

Referring to FIG. 5A, in the at least one dome switch 3200 according to an embodiment, the relatively long edges (e.g., the edges having the predetermined length L1 in FIG. 5B) among the edges of the rectangular shape may be disposed to be substantially parallel to the z-axis. For example, the at least one dome switch 3220 may be disposed such that the relatively long ones of the edges of the rectangular shape face the conductive patches 332, 334, 336, 338, and 340. The fact that the long edges are disposed to face the conductive patches may mean that the long edges are substantially perpendicular to an axis (e.g., the y-axis) on which the conductive patches 332, 334, 336, 338, and 340 are arranged. In another embodiment, referring to FIG. 5C, in the at least one dome switch 3200, relatively short edges (e.g., the edges having a predetermined width W2 in FIG. 5B) among the edges of the rectangular shape may be disposed to be parallel to the z-axis. For example, the at least one dome switch 3200 may be disposed such that the relatively short ones of the edges of the rectangular shape face the conductive patches. As illustrated in FIGS. 5A and 5C, the distance between the at least one dome switch 3200 and the conductive patches adjacent to the at least one dome switch 3200 may vary depending on the direction in which the at least one dome switch is disposed on the first substrate 320.

The electronic device 101 according to an embodiment may include a first connecting member 512. In an embodiment, the at least one dome switch 3200 may be electrically connected to a main printed circuit board (not illustrated) of the electronic device 101 by the first connecting member 512. The first connecting member 512 may be electrically connected to the at least one dome switch 3200 at one end thereof and may extend from the one end through the first substrate 320 and the second substrate 410. In an embodiment, the other end of the first connecting member 512 may be electrically connected to a conductive trace provided on the second substrate 410 and may be electrically connected to the main printed circuit board of the electronic device 101 via the module interface of the antenna structure 346. In another embodiment, the other end of the first connecting member 512 may extend to the main printed circuit board of the electronic device 101 separately from the module interface and be electrically connected to the main printed circuit board.

In an embodiment, the first connecting members 512 may be a conductive line connected via a via hole. In an embodiment, the first connecting member 512 may include multiple conductive traces (e.g., signal lines and ground lines) to generate electrical signals when the at least one dome switch 3200 is pressed by the at least one protrusion 3600.

In another embodiment, the at least one dome switch 3200 may include only one dome switch. In this case, the at least one protrusion of the key button assembly 100 may include only one protrusion corresponding to the one dome switch. The one dome switch may be disposed at a position corresponding to an area where any two of the conductive patches 332, 334, 336, 338, and 340 are spaced apart from each other.

Figure 6:
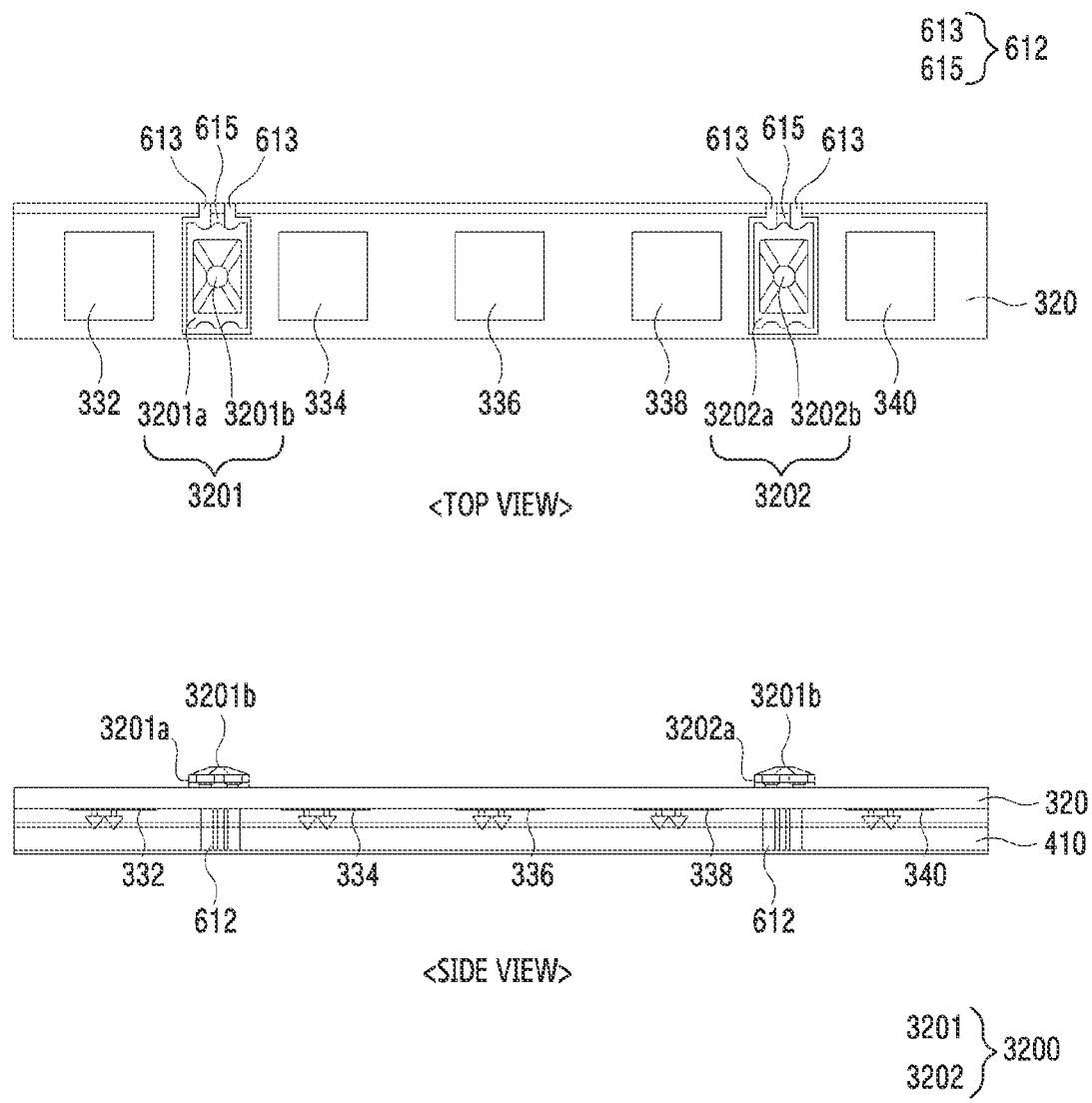
FIG. 6 illustrates a first substrate and a second substrate on which dome switches according to an embodiment are disposed.

FIG. 6 illustrates the first substrate and the second substrate on which dome switches according to an embodiment are disposed.

Figure 7:
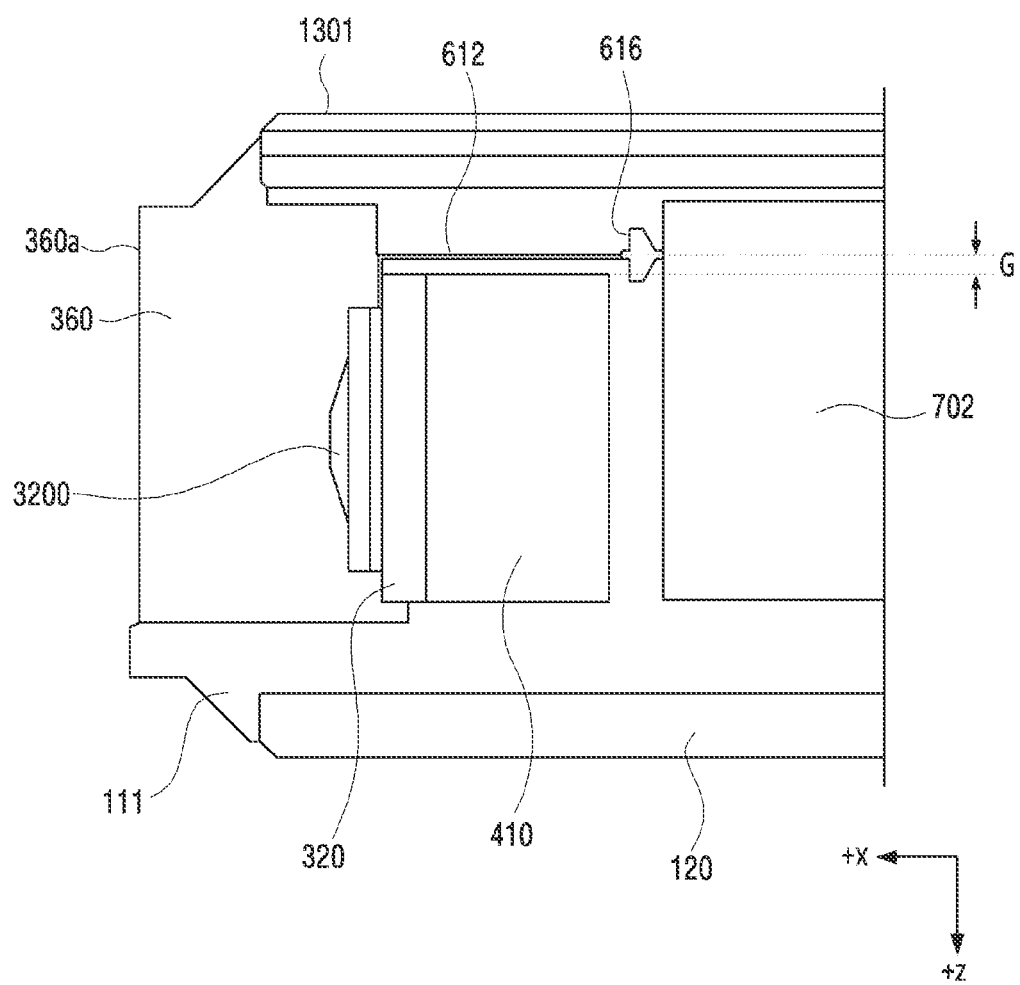
FIG. 7 illustrates an electronic device according to an embodiment.

FIG. 7 illustrates an electronic device according to an embodiment.

In FIGS. 6 and 7, redundant descriptions of components having the same reference numerals as those described above will be omitted.

Referring to FIGS. 6 and 7, an electronic device 101 according to an embodiment may include a second connecting member 612. In an embodiment, when including the second connecting member 612, the electronic device 101 may not include the first connecting member 512. In another embodiment, the electronic device 101 may include both the first connecting member 512 and the second connecting member 612. In this case, the first dome switch 3201 may be electrically connected to the first connecting member 512 or the second connecting member 612, and the second dome switch 3202 may be electrically connected to the second connecting member 612 or the first connecting member 512.

In an embodiment, the second connecting member 612 may include a flexible printed circuit board. The second connecting member 612 may include multiple conductive traces configured to generate electrical signals when the at least one dome switch 3200 is pressed by the at least one protrusion 3600. The multiple conductive traces may include, for example, a ground line 613 electrically connected to a first portions 3201a or 3202a of the at least one dome switch 3200 and a signal line selectively electrically connected to a second portion 3201b or 3202b of the at least one dome switch 3200. The ground line 613 may be electrically connected to a first contact (e.g., a ground), which has a relatively low voltage in the main printed circuit board of the electronic device 101, and the signal line 615 may be electrically connected to a second contact, which has a relatively high voltage level in the main printed circuit board of the electronic device 101. The second portion 3201b or 3202b of the at least one dome switch 3200 may be electrically connected to the signal line 615 by being pressed by a user's manipulation. When the second portion 3201b or 3202b of the at least one dome switch 3200 is pressed, a current flow may occur in a circuit connecting the first contact and the second contact, and an electrical signal based on the current flow may be provided to the processor of the electronic device 101.

Referring to FIG. 7, the at least one dome switch 3200 according to an embodiment may be electrically connected to a main printed circuit board 702 of the electronic device 101 by the second connecting member 612. One end of the second connecting member 612 may be electrically connected to the at least one dome switch 3200, and the second connecting member 612 may extend from the one end along the periphery of the first substrate 320 and the second substrate 410. In an embodiment, the other end of the second connecting member 612 may be electrically connected to the main printed circuit board 702 of the electronic device 101. For example, the second connecting member 612 may include a first portion extending from the one end along one surface (e.g., the surface facing the +x direction) of the first substrate 320, a second portion extending from the first portion along a side surface (e.g., the surface facing the −z direction) of the first substrate 320, and a third portion extending from the second portion to the other end along a side surface (e.g., the surface facing the −z direction) of the second substrate 410. In an embodiment, the second connecting member 612 may be spaced apart from the side surface of the first substrate 320 and the side surface of the second substrate 410 by a predetermined gap G. Since the second connecting member 612 is spaced apart from the first substrate 320 and the second substrate 410, the effect of a signal transmitted via the second connecting member 612 on the performance (e.g., radiation efficiency) of the antenna structure 346 may be reduced. The predetermined gap G may be about 0.2 mm, but is not limited thereto.

In an embodiment, a component 616 may be disposed between the second connecting member 612 and the main printed circuit board 702. In an embodiment, the component 616 may include at least one inductor having a predetermined inductance value to reduce the effect of the signal transmitted to the second coupling member 612 on the antenna structure 346. The at least one inductor may be connected in series with at least one of the conductive traces of the second connecting member 612. The predetermined inductance value may be about 10 nH, but is not limited thereto.

In an embodiment, the second substrate 410 may be spaced apart from the top surface 360a of the key button 360 by a predetermined distance. The predetermined distance may be about 3.2 mm, but is not limited thereto.

Figure 8:
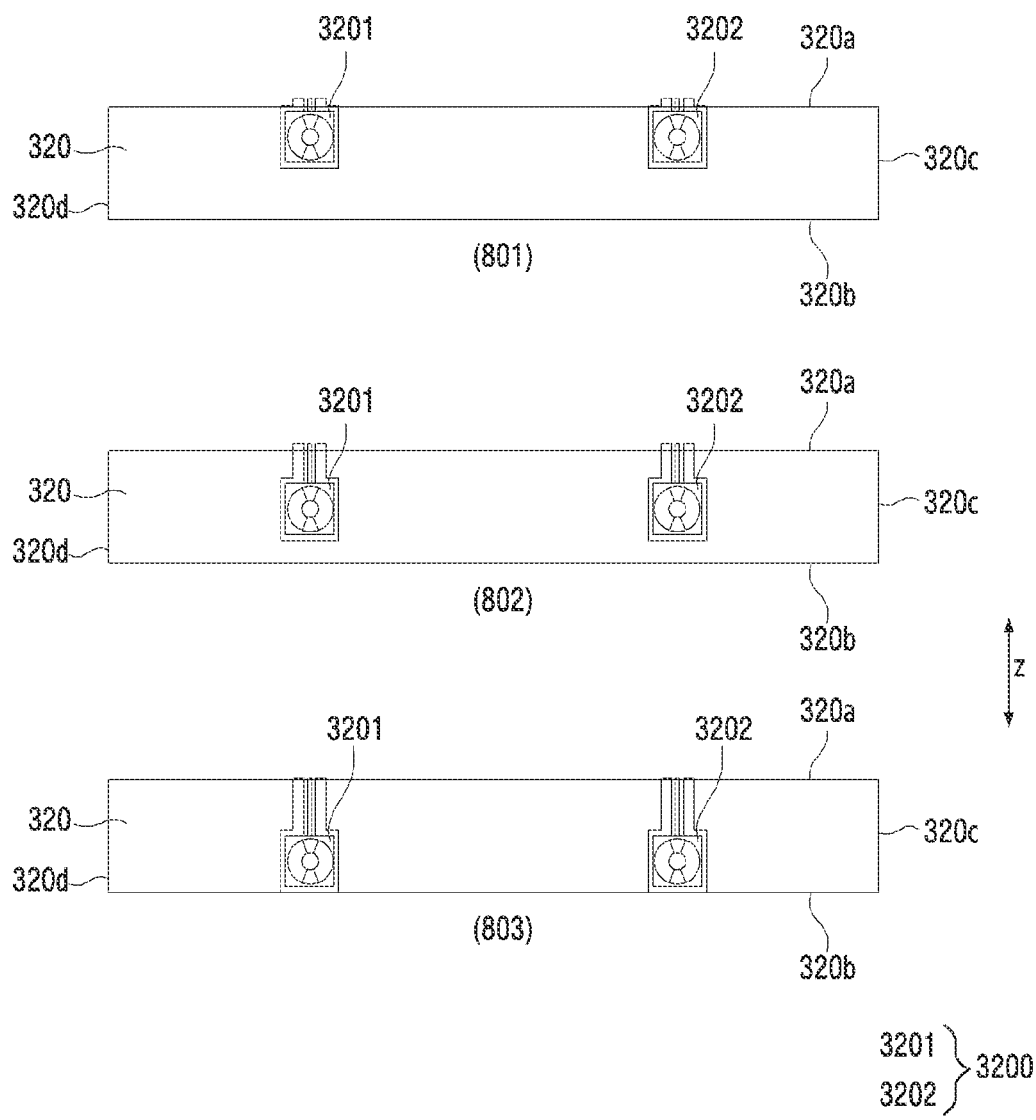
FIG. 8 illustrates examples of positions where dome switches according to an embodiment are disposed on a first substrate.

FIG. 8 illustrates examples of positions where dome switches according to an embodiment are disposed on a first substrate.

Redundant descriptions of components of FIG. 8 having the same reference numerals as those described above will be omitted.

Referring to FIG. 8, the first substrate 320 may include a first edge 320a, a second edge 320b extending to be substantially parallel to the first edge 320a, a third edge 320c extending from one end of the first edge 320a to one end of the second edge 320b in a direction substantially perpendicular to the first edge 320a, and a fourth edge 320b extending from the other end of the first edge 320a to the other end of the second edge 320b to be substantially parallel to the third edge 320a.

Referring to reference numeral 801 in FIG. 8, the at least one dome switch 3200 may be disposed to be more biased toward the first edge 320a. For example, the at least one dome switch 3200 may be disposed closer to the first edge 320a than the second edge 320b.

Referring to reference numeral 802 in FIG. 8, the at least one dome switch 3200 may be disposed between the first edge 320a and the second edge 320b, and the at least one dome switch 3200 may be disposed at substantially the same distance from each of the first edge 320a and the second edge 320b.

Referring to reference numeral 803 in FIG. 8, the at least one dome switch 3200 may be disposed to be more biased toward the second edge 320b. For example, the at least one dome switch 3200 may be disposed closer to the second edge 320b than the first edge 320a.

As illustrated in FIG. 8, the at least one dome switch 3200 may be disposed on the first substrate 320 at various positions with respect to the z-axis. Depending on the area and/or curvature of the side surface of the electronic device 101, a position where the key button 360 can be disposed may be limited, and depending on the position of the key button 360 (or the at least one protrusion 3600), the position of the at least one dome switch 3200 may also be limited. As illustrated in FIG. 8, the at least one dome switch 3200 which may be disposed at various positions along the z-axis of the first substrate 320 may provide a degree of design freedom for the external design of the electronic device 101.

The at least one dome switch 3200 illustrated in FIG. 8 is illustrated as having a square shape like the at least one dome switch 3200a of FIG. 5B, but is not limited thereto. For example, the shape of the at least one dome switch 3200 illustrated in FIG. 8 may have a rectangular shape. When the at least one dome switch 3200 has a rectangular shape, the direction in which the dome switch is arranged on the first substrate 320 may also be different, as illustrated in FIG. 5C.

Figure 9:
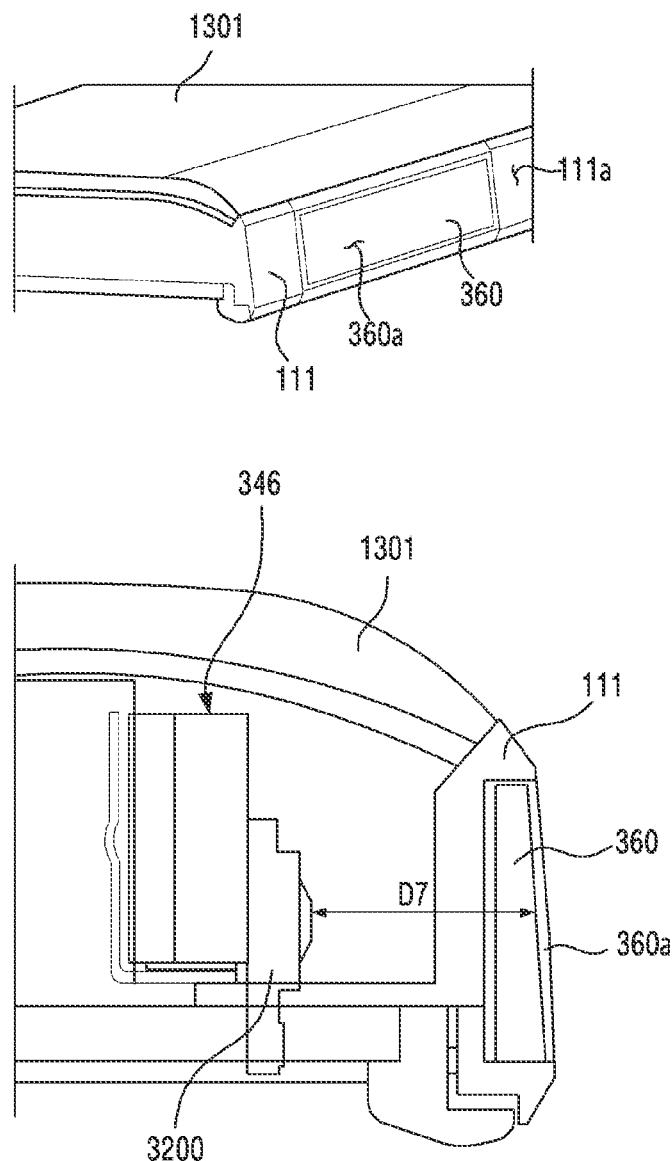
FIG. 9 illustrates an electronic device according to another embodiment.

FIG. 9 illustrates an electronic device according to another embodiment.

Redundant descriptions of components of FIG. 9 having the same reference numerals as those described above will be omitted.

Referring to FIG. 9, unlike the curved side surface 1111 of FIG. 2, the side surface 111a of the first part 111 may include a substantially flat surface. In this case, the top surface 360a of the key button 360 may include a substantially flat surface and may extend at substantially the same slope as the side surface 111a.

In an embodiment, the antenna structure 346 may be surrounded by the first cover 1301, the first part 111, and the key button 360. When the first cover 1301 is made of a non-conductive material (e.g., glass) and the first part 111 is made of a conductive material (e.g., metal), in consideration of the beam pattern of the antenna structure 346, a portion of the periphery of the antenna structure 346 may be covered by the first cover 1301 of the non-conductive material, and a portion of the periphery may be covered by the first part 111 of the conductive material. In a comparative embodiment, in order to satisfy an area where the antenna structure 346 is covered by the non-conductive material, the first cover 1301 may extend while being further bent toward the side surface 111a than in the illustrated example. In this case, the processing difficulty of the first cover 1301 may increase and the yield may decrease. In an embodiment, when the key button 360 is made of a non-conductive material, even if the first cover 1301 does not extend to the side surface 111a, the area where the antenna structure 346 is covered by the non-conductive material may be satisfied.

In an embodiment, at least a portion of the first part 111 may operate as an antenna radiator distinct from the antenna structure 346.

In an embodiment, the at least one dome switch 3200 may be spaced apart from the top surface 360a of the key button 360 by a seventh predetermined distance D7. The seventh predetermined distance D7 may be about 4 mm, but is not limited thereto.

Figure 10:
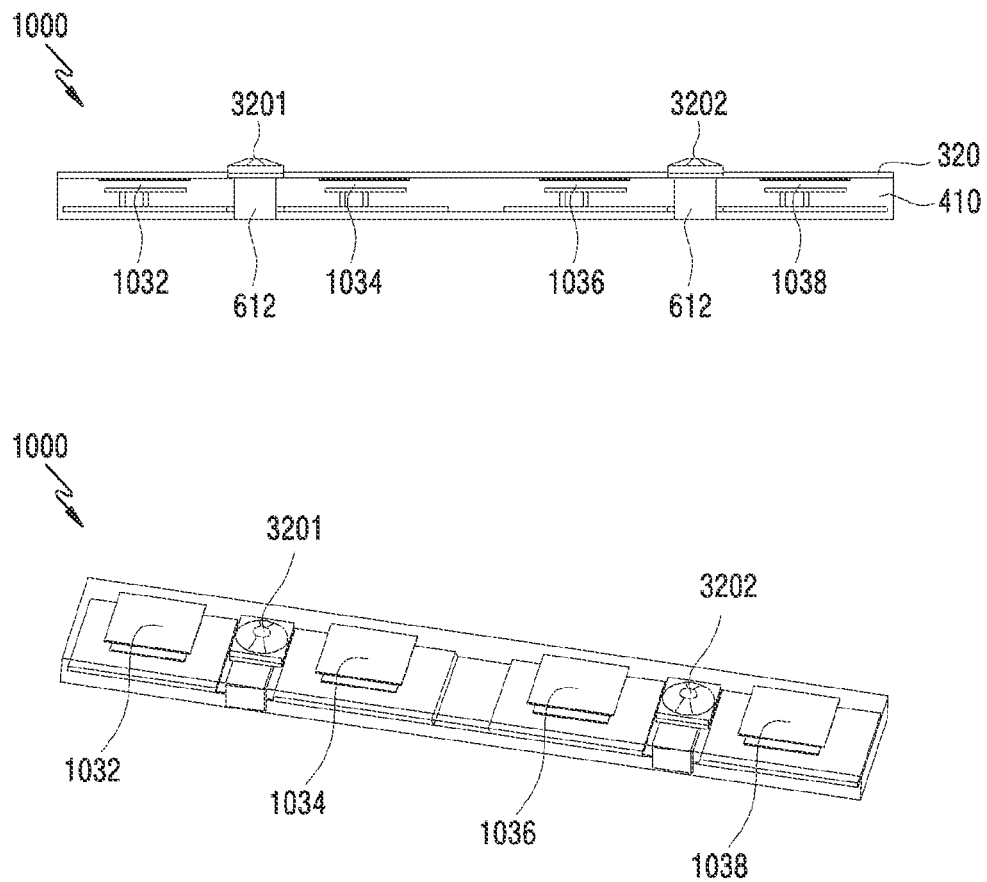
FIG. 10 illustrates a key button assembly according to another embodiment.

FIG. 10 illustrates a key button assembly according to another embodiment.

In FIG. 10, the key buttons of the key button assembly 1000 are omitted for convenience of description, but the description of the key button 360 of FIG. 3 may be equally, similarly, or correspondingly applied.

Redundant descriptions of components of FIG. 10 having the same reference numerals as those described above will be omitted.

Referring to FIG. 10, the key button assembly 1000 according to an embodiment may include conductive patches 1032, 1034, 1036, and 1038 disposed on or inside a second substrate 410. In an embodiment, the conductive patches 1032, 1034, 1036, and 1038 may be spaced apart from each other. In an embodiment, the intervals between the conductive patches 1032, 1034, 1036, and 1038 may be substantially the same. In another embodiment, the distance between the second conductive patch 1034 and the third conductive patch 1036 may be smaller than the distance between the first conductive patch 1032 and the second conductive patch 1034 between which the first dome switch 3201 is disposed and/or the distance between the third conductive patch 1036 and the fourth conductive patch 1038 between which the second dome switch 3202 is disposed.

In an embodiment, the first dome switch 3201 may be at a position corresponding to an area between the first conductive patch 1032 and the second conductive patch 1034 on the first substrate. For example, the first dome switch 3201 may not overlap the first conductive patch 1032 and the second conductive patch 1034 and may overlap a portion of the second substrate 410 between the first conductive patch 1032 and the second conductive patch 1032.

In an embodiment, the second dome switch 3202 may be disposed at a position corresponding to an area between the third conductive patch 1036 and the fourth conductive patch 1038 on the first substrate 320. For example, the second dome switch 3202 may not overlap the third conductive patch 1036 and the fourth conductive patch 1038 and may overlap the portion of the second substrate 410 between the third conductive patch 1036 and the second conductive patch 1036.

Figure 11:
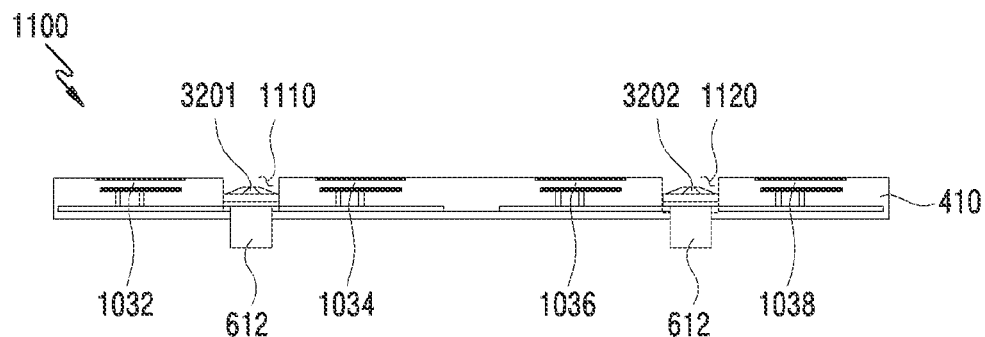
FIG. 11 illustrates a key button assembly according to another embodiment.
Figure 11:
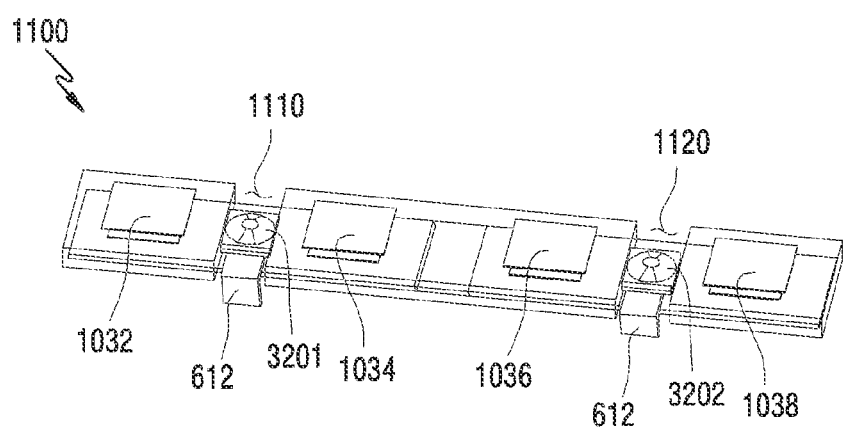

FIG. 11 illustrates a key button assembly according to another embodiment.

In FIG. 11, the key buttons of the key button assembly 1100 are omitted for convenience of description, but the description of the key button 360 of FIG. 3 may be equally, similarly, or correspondingly applied.

Redundant descriptions of components of FIG. 11 having the same reference numerals as those described above will be omitted.

Referring to FIG. 11, the second substrate 410 of the key button assembly 1100 according to an embodiment may include a first opening 1110 and a second opening 1120 provided in one surface of the second substrate 410. The first opening 1110 and the second opening 1120 may penetrate portions of the second substrate 410 in the depth direction of the second substrate 410.

In an embodiment, a first dome switch 3201 may be inserted into the first opening 1110, and a second dome switch 3202 may be inserted into the second opening 1120. In an embodiment, the first opening 1110 may have an area equal to or greater than that of the first dome switch 3201, and the second opening 1120 may have an area equal to or greater than that of the second dome switch 3202. In an embodiment, the depth of the first opening 1110 and the second opening 1120 may be smaller than the thickness of the second substrate 410 and may be equal to or greater than the thickness of the first dome switch 3201 and the second dome switch 3202. The first dome switch 3201 and the second dome switch 3202 may be entirely inserted into the first opening 1110 and the second opening 1120 without protruding out of the second substrate 410.

In the key button assembly 1100 according to an embodiment, since the first dome switch 3201 and the second dome switch 3202 are respectively disposed in the first opening 1110 and the second opening 1120, the first substrate 320 may not be included.

Figure 12A:
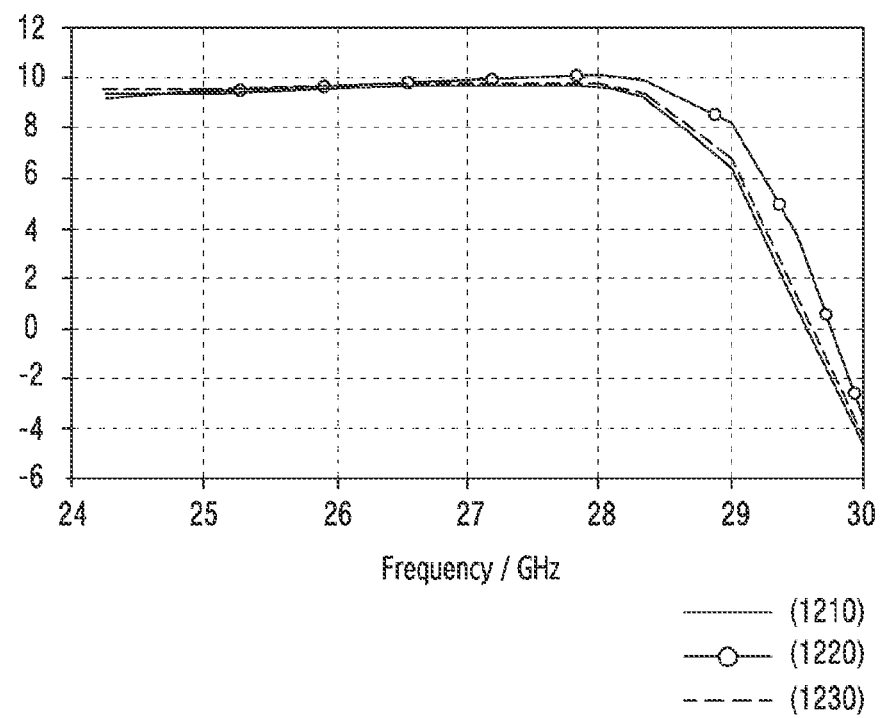
FIG. 12A illustrates graphs representing relative gains of signals corresponding to first polarization characteristics of key button assemblies according to an embodiment.

FIG. 12A illustrates graphs representing relative gains of signals corresponding to the first polarization characteristics of key button assemblies according to an embodiment.

Reference numeral (1210) in FIG. 12A illustrates a relative gain for a signal corresponding to the first polarization characteristic (e.g., horizontal polarization) of the key button assembly 100 illustrated in FIG. 3.

Reference numeral (1220) in FIG. 12A illustrates a relative gain for a signal corresponding to the first polarization characteristic of the key button assembly 1000 illustrated in FIG. 10.

Reference numeral (1230) in FIG. 12A illustrates a relative gain for a signal corresponding to the first polarization characteristic of the key button assembly 1100 illustrated in FIG. 11.

Relative gains for the first polarization characteristics of the key button assembly 100, the key button assembly 1000, and the key button assembly 1100 may be generally similar to each other. In a frequency range of about 27 GHz or higher, the relative gain value for the first polarization characteristic of the key button assembly 1000 may be higher than those of the key button assembly 100 and the key button assembly 1100. In a frequency range of about 27 GHz or higher, the relative gain value for the first polarization characteristic of the key button assembly 1100 may be higher than that of the key button assembly 100.

Figure 12B:
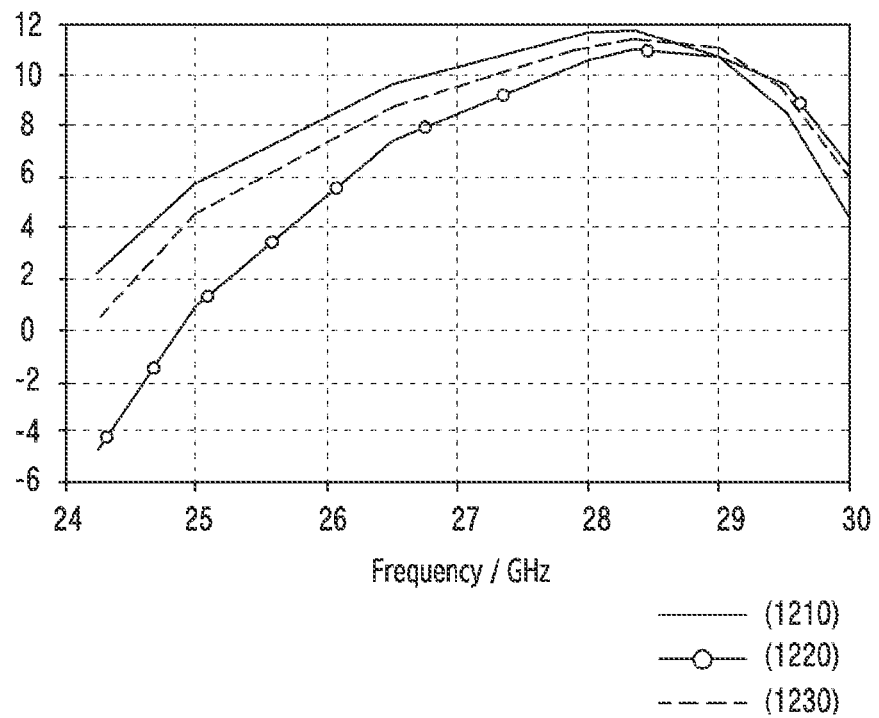
FIG. 12B illustrates graphs representing relative gains of signals corresponding to first polarization characteristics of key button assemblies according to an embodiment.

FIG. 12B illustrates graphs illustrating relative gains of signals corresponding to the first polarization characteristics of key button assemblies according to an embodiment.

Reference numeral (1210) in FIG. 12B illustrates a relative gain for a signal corresponding to a second polarization characteristic (e.g., vertical polarization) orthogonal to the first polarization characteristic of the key button assembly 100 illustrated in FIG. 3.

Reference numeral (1220) in FIG. 12B illustrates a relative gain for a signal corresponding to the second polarization characteristic of the key button assembly 1000 illustrated in FIG. 10.

Reference numeral (1230) in FIG. 12B illustrates a relative gain for a signal corresponding to the second polarization characteristic of the key button assembly 1100 illustrated in FIG. 11.

Referring to FIG. 12B, in a frequency range of about 29 GHz or lower, the relative gain value of a signal corresponding to the second polarization characteristic of the key button assembly 100 may be higher than those of the key button assembly 1000 and the key button assembly 1100. In a frequency range of about 29 GHz or lower, the relative gain value of a signal corresponding to the second polarization characteristic of the key button assembly 1100 may be higher than that of the key button assembly 1000. In a frequency range of about 29 GHz or higher, the relative gain values of signals corresponding to the second polarization characteristics of the key button assembly 1000 and the key button assembly 1100 may be substantially similar to each other and may be higher than that of the key button assembly 100.

Figure 13:
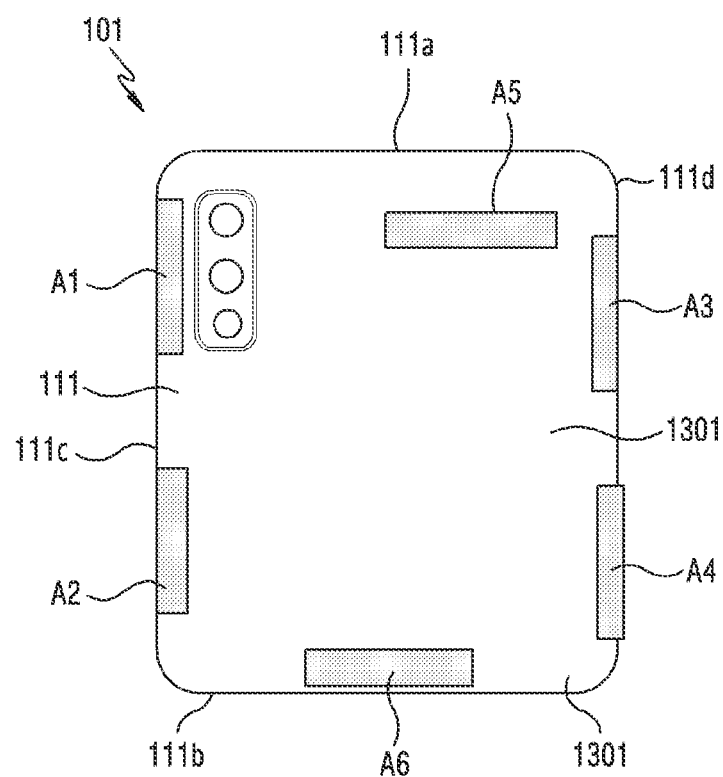
FIG. 13 illustrates areas where an antenna structure or a key button assembly according to an embodiment may be disposed in a first part of an electronic device.

FIG. 13 illustrates areas where an antenna structure or a key button assembly according to an embodiment may be disposed in a first part of an electronic device.

Figure 14A:
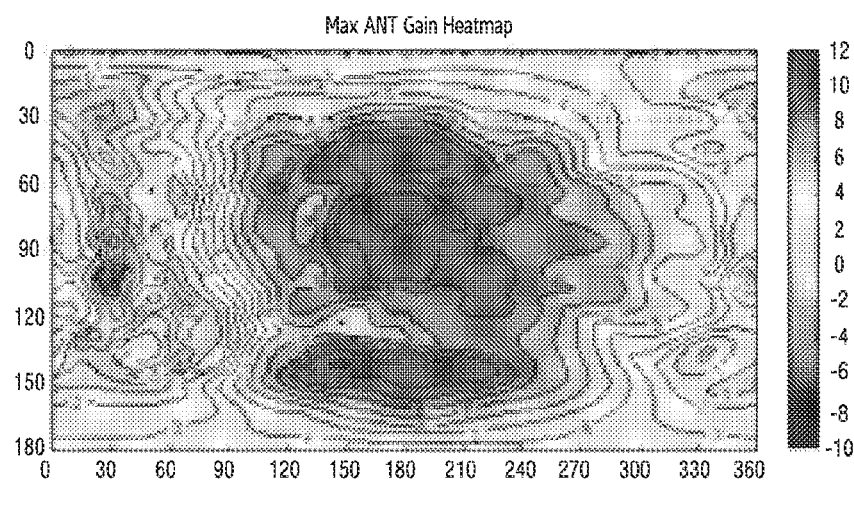
FIG. 14A illustrates a radiation pattern of an antenna structure for a signal corresponding to a first frequency band.
Figure 14A:
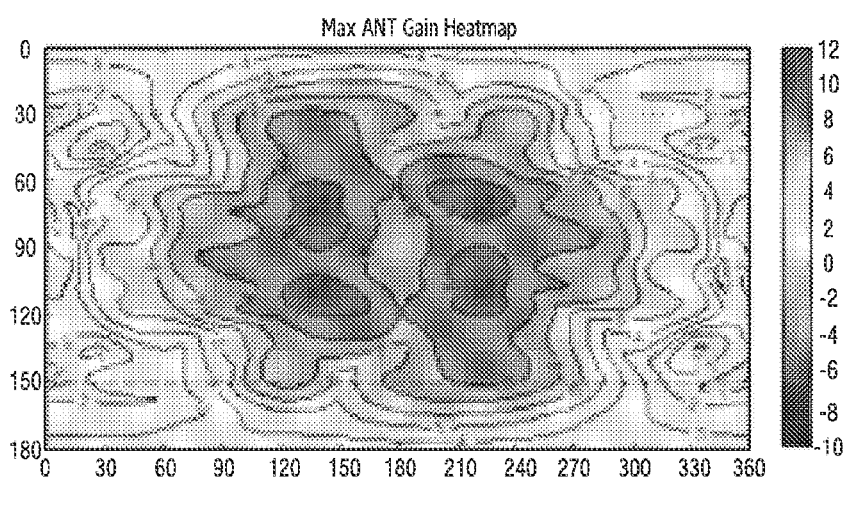

FIG. 14A illustrates a radiation pattern of an antenna structure for a signal corresponding to a first frequency band.

Figure 14B:
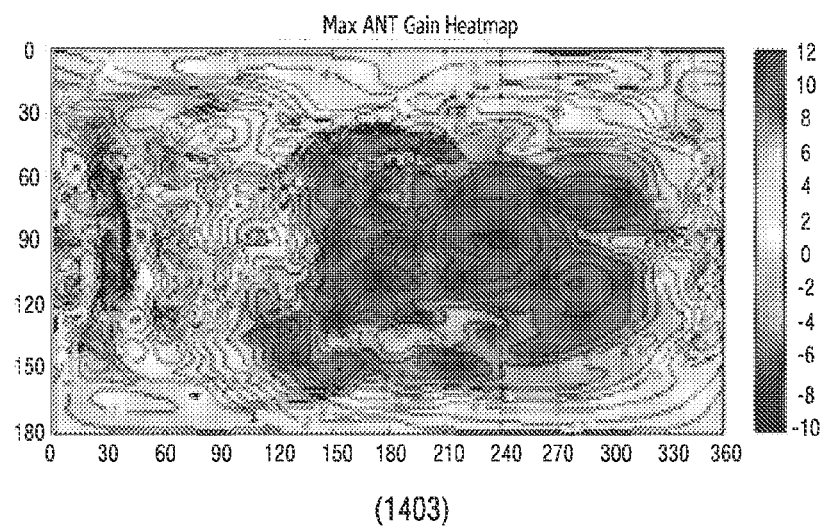
FIG. 14B illustrates a radiation pattern of an antenna structure for a signal corresponding to a second frequency band.
Figure 14B:
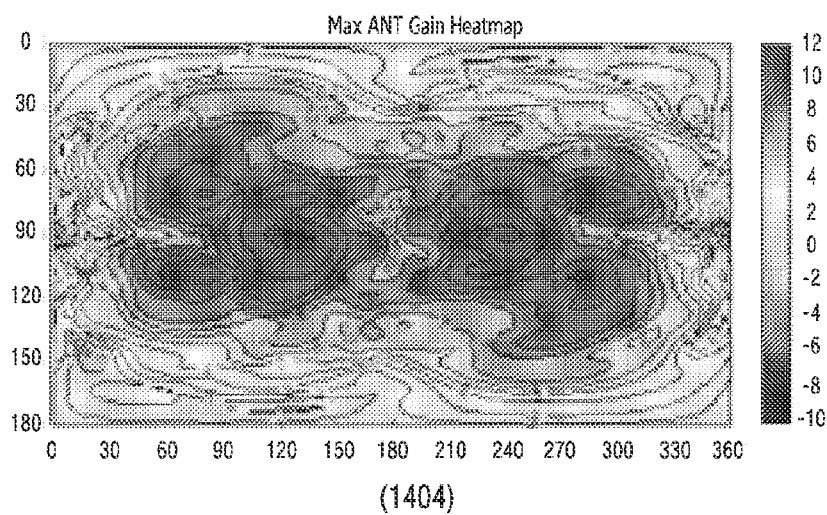

FIG. 14B illustrates a radiation pattern of an antenna structure for a signal corresponding to a second frequency band.

In FIG. 13, a second part 112 and a connecting portion 113 of the electronic device 101 are omitted for convenience of description.

Redundant descriptions of components of FIG. 13 having the same reference numerals as those described above will be omitted.

Referring to FIG. 13, the electronic device 101 according to an embodiment may include a first side surface 111a, a second side surface 111b, a third side surface 111c, and a fourth side surface 111d. In an embodiment, the first side surface 111a and the second side surface 111b may be substantially parallel to each other. The second side surface 111b may refer to a portion of a connecting portion (not illustrated) (113 in FIG. 1C). In an embodiment, the third side surface 111c may extend toward the second side surface 111b from one end of the first side surface 111a in a direction substantially perpendicular to the same. In an embodiment, the fourth side surface 111d may extend toward the second side surface 111b from the other end of the first side surface 111a in a direction substantially perpendicular to the same. In an embodiment, the third side surface 111c and the fourth side surface 111d may be substantially parallel to each other.

In an embodiment, the first part 111 may include a first area A1, a second area A2, a third area A3, a fourth area A4, a fifth area A5, and a sixth area A3.

In an embodiment, the first to fourth areas A1 to A4 may be located on the side surfaces of the first part 111. For example, the first area A1 and the second area A2 may be located on the third side surface 111c, and the third area A3 and the fourth area A4 may be located on the fourth side surface 111d. In an embodiment, the first area A1 and the third area A3 may be closer to the first side surface 111a than the second side surface 111b, and the second area A2 and the fourth area A4 may be closer to the second side surface 111b than the first side surface 111a. In an embodiment, an antenna structure (e.g., the antenna structure 346 of FIG. 3) or a key button assembly (e.g., the key button assembly 100 of FIG. 3) including the antenna structure may be disposed in each of the first to fourth areas A1 to A4 and may be disposed to form a beam to be directed toward a side surface of the first part 111. Hereinafter, the antenna structure or the key button assembly mounted in each of the first area A1 to the fourth area A4 such that a beam is formed to be directed toward a side surface will be referred to as a "vertically mounted module".

In an embodiment, the fifth area A5 and the sixth area A6 may be located on the first cover 1301 defining the rear surface of a first part 111. For example, although the fifth area A5 is spaced apart from the side surfaces of the first part 111 but may be located closer to the first side surface 111a and the fourth side surface 111d than the second side surface 111b and the third side surface 111c. For example, the sixth area A6 may be located between the third side surface 111c and the fourth side surface 111d and may be located closer to the second side surface 111b than the first side surface 111a. In an embodiment, the fifth area A5 and the sixth area A6 may be areas in each of which an antenna structure (e.g., the antenna structure 346 of FIG. 3) may be disposed. Inside the first part 111, an antenna structure disposed in each of the fifth area A5 and the sixth area A6 may form a beam to be directed toward the rear surface of the first part 111 (or toward the first cover 1301). Hereinafter, the antenna structure disposed in each of the fifth area A5 and the sixth area A6 to form a beam to be directed toward the rear surface of the first part 111 will be referred to as a "horizontally mounted module".

The electronic device 101 according to an embodiment may include at least two vertically mounted modules. For example, the electronic device 101 may include a key button assembly disposed in the first area A1 and an antenna structure disposed in the fourth area A4. As another example, the electronic device 101 may include a key button assembly disposed in the second area A2 and a key button assembly disposed in the third area A3. Examples in which the key button assemblies and/or the antenna structures are disposed in the first part 111 are not limited by the above-described examples.

An electronic device 101 according to another embodiment may include at least one horizontally mounted module and one vertically mounted module. For example, the electronic device 101 may include an antenna structure disposed in the fifth area A5 and a key button assembly disposed in the first area A1. As another example, the electronic device 101 may include an antenna structure disposed in the sixth area A6 and a key button assembly disposed in the third area A3. Examples in which the key button assemblies and/or the antenna structures are disposed in the first part 111 are not limited by the above-described examples.

Reference numeral 1401 in FIG. 14A illustrates a radiation pattern for a first frequency band when the electronic device 101 includes one horizontally mounted module and one vertically mounted module. The center frequency of the first frequency band may be, for example, 28 GHz.

Reference numeral 1402 in FIG. 14A illustrates a radiation pattern for the first frequency band when the electronic device 101 includes two vertically mounted modules.

Referring to FIG. 14A, the electronic device 101 according to an embodiment may ensure wider coverage when the electronic device includes two vertically mounted modules (reference numeral 1402) than when the electronic device includes one horizontally mounted module and one vertically mounted module (reference numeral 1401).

Reference numeral 1403 in FIG. 14B illustrates a radiation pattern for a second frequency band when the electronic device 101 includes one horizontally mounted module and one vertically mounted module. The second frequency band may be higher than the first frequency band. The center frequency of the second frequency band may be, for example, 39 GHz.

Reference numeral 1404 in FIG. 14B illustrates a radiation pattern for the second frequency band when the electronic device 101 includes two vertically mounted modules.

Referring to FIG. 14B, the electronic device 101 according to an embodiment may ensure wider coverage when the electronic device includes two vertically mounted modules (reference numeral 1404) than when the electronic device includes one horizontally mounted module and one vertically mounted module (reference numeral 1403).

Figure 15A:
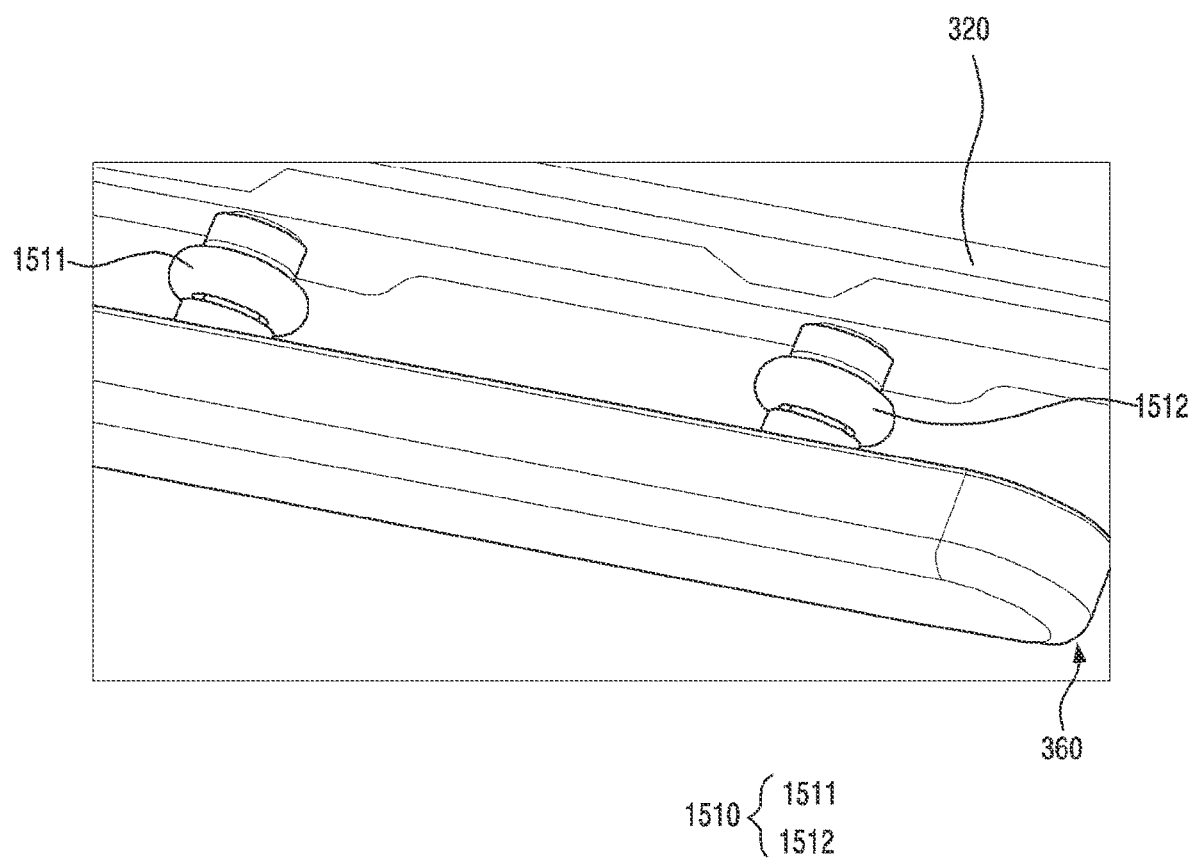
FIG. 15A is a perspective view of the electronic device including at least one waterproof structure according to an embodiment.
Figure 15B:
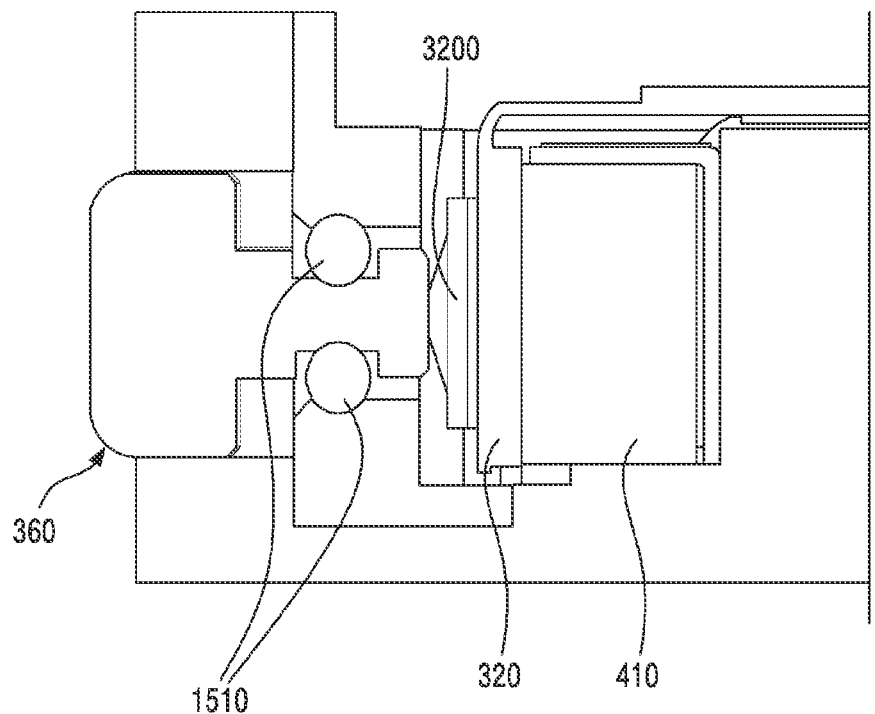
FIG. 15B is a cross-sectional view of the electronic device including the at least one waterproof structure according to an embodiment when the electronic device is viewed from a side.
Figure 15C:
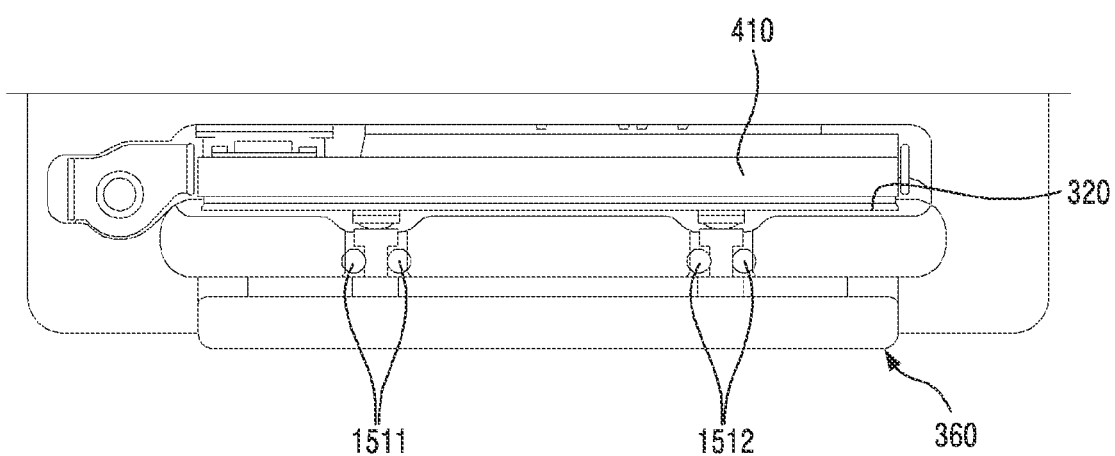
FIG. 15C is a plan view of the electronic device including the at least one waterproof structure according to an embodiment when the electronic device is viewed from a front side.

FIG. 15A is a perspective view of an electronic device 101 including at least one waterproof structure 1510 according to an embodiment. FIG. 15B is a cross-sectional view of the electronic device 101 including the at least one waterproof structure 1510 according to an embodiment when the electronic device is viewed from a side. FIG. 15C is a plan view of the electronic device 101 including the at least one waterproof structure 1510 according to an embodiment when the electronic device is viewed from the front side.

Referring to FIGS. 15A, 15B, and 15C, the electronic device 101 may include at least one waterproof structure 1510 between the first substrate 320 and the key button 360.

According to an embodiment, the at least one waterproof structure 1510 may include a first waterproof structure 1511 or a second waterproof structure 1512. In an example, the at least one waterproof structure 1510 may include only one of the first waterproof structure 1511 or the second waterproof structure 1512.

According to an embodiment, the at least one waterproof structure 1510 may have an O-ring shape surrounding at least a portion of the key button 360. In an example, the at least one waterproof structure 1510 may be integrated with at least a portion of the key button 360.

According to an embodiment, the at least one waterproof structure 1510 may prevent failure of the dome switch 3200, the first substrate 320, and the second substrate 410 by blocking inflow of external moisture through the key button 360.

According to an embodiment, the length of the major axis of the key button 360 may be 24.8 mm, and the length of the minor axis of the key button 360 may be 3.5 mm. However, the lengths of the axes of the key button 360 are not limited to the above values.

Figure 16A:
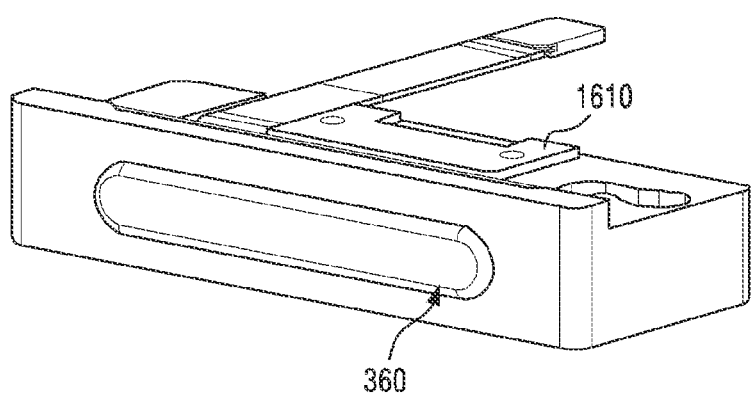
FIG. 16A is a perspective view of a portion of an electronic device according to an embodiment.
Figure 16B:
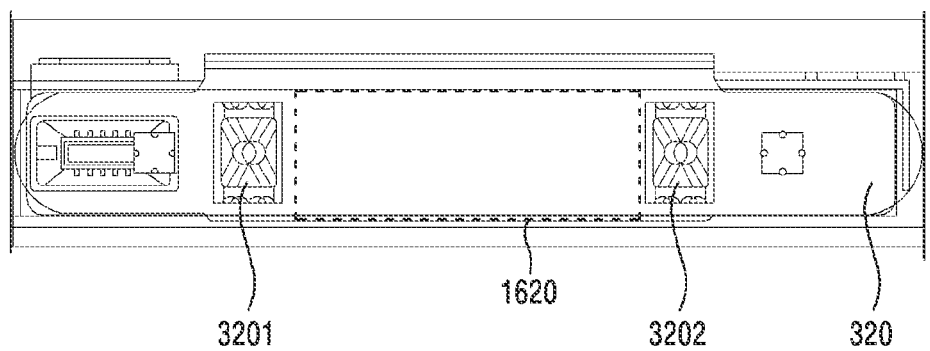
FIG. 16B is a plan view in which the electronic device including an air gap according to an embodiment is transparently processed.
Figure 16C:
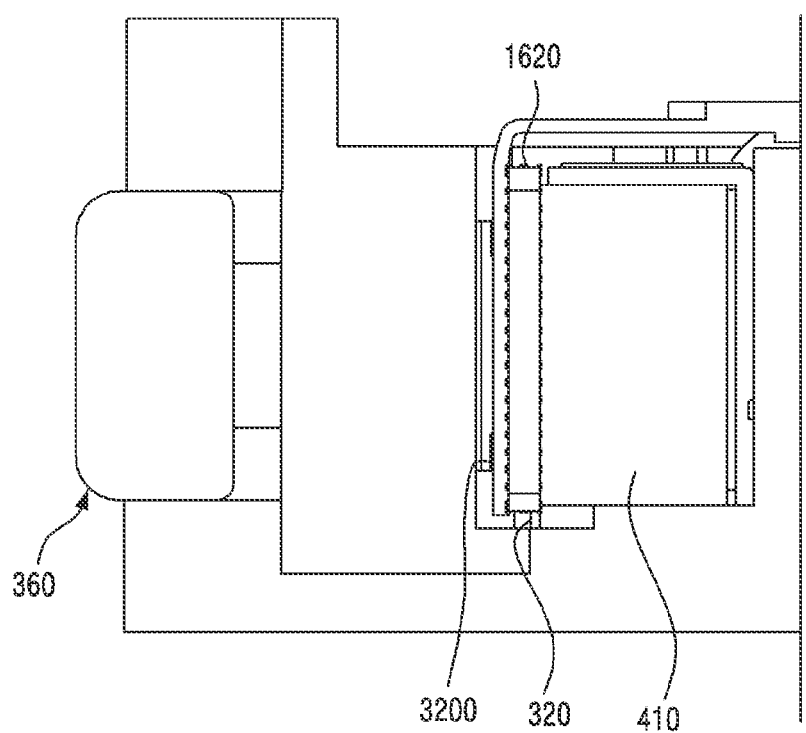
FIG. 16C is a cross-sectional view of the electronic device including the air gap according to an embodiment when the electronic device is viewed from a side.

FIG. 16A is a perspective view of a portion of an electronic device 101 according to an embodiment. FIG. 16B is a plan view in which the electronic device 101 including an air gap 1620 according to an embodiment is transparently processed. FIG. 16C is a cross-sectional view of the electronic device 101 including the air gap 1620 according to an embodiment when the electronic device 101 is viewed from a side.

Referring to FIGS. 16A, 16B, and 16C, the electronic device 101 may include the air gap 1620 between the dome switch 3200 and the first substrate 320.

According to an embodiment, an FPCB 1610 may be disposed on at least a portion of the electronic device 101. In an example, the FPCB 1610 may be disposed in a shape that surrounds a surface parallel to the first substrate 320 from a surface perpendicular to the first substrate 320.

According to an embodiment, the air gap 1620 may be provided in a portion where at least a portion of the FPCB 1610 is removed. In an example, the air gap 1620 may be provided in a portion where at least a portion of the FPCB 1610 provided on the surface parallel to the first substrate 320 is removed.

According to an embodiment, the air gap 1620 may be provided in an area between a first dome switch 3201 and a second dome switch 3202. In an example, the air gap 1620 may occupy most of the space between the first dome switch 3201 and the second dome switch 3202 in the first substrate 320.

According to an embodiment, since the air gap 1620 is provided in the portion from which at least a portion of the FPCB 1610 is removed, antenna radiation performance in the direction of the major axis of the key button 360 may be improved.

According to an embodiment, the length of the major axis of the key button 360 may be 24.8 mm, and the length of the minor axis of the key button 360 may be 3.5 mm. However, the lengths of the axes of the key button 360 are not limited to the above values.

Figure 17A:
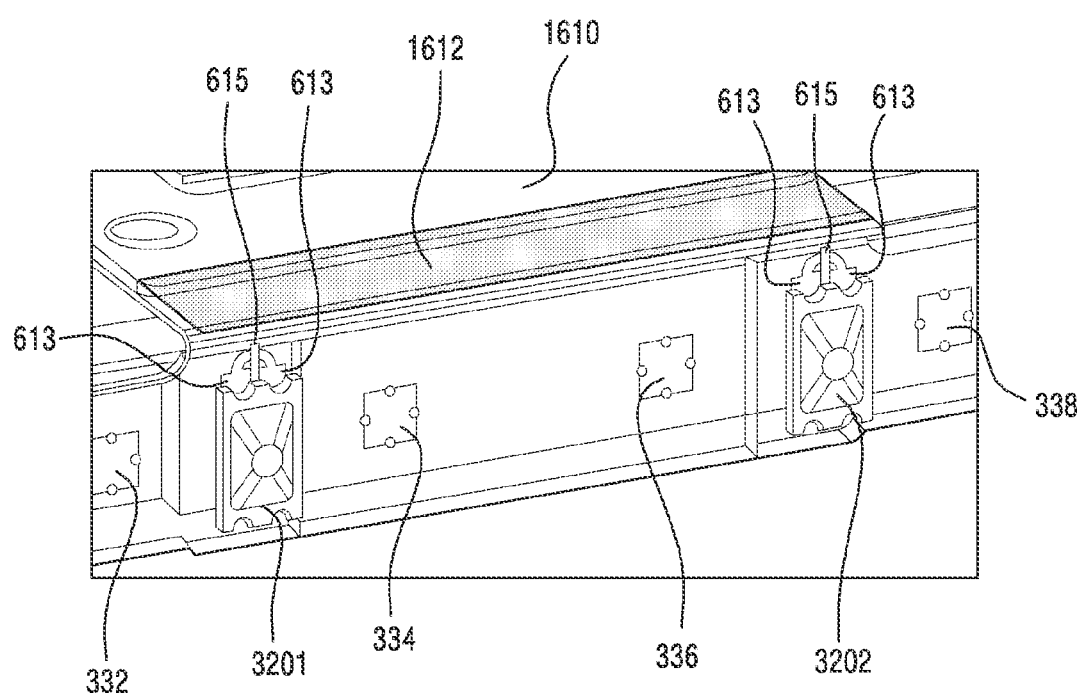
FIG. 17A is a perspective view of an electronic device including a portion of an FPCB from which a ground area is entirely removed according to an embodiment.
Figure 17B:
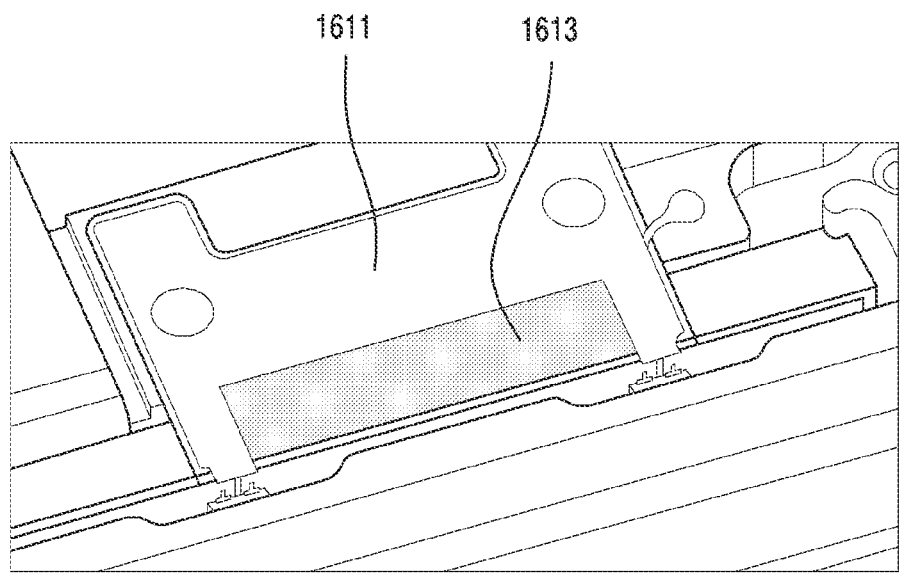
FIG. 17B is a perspective view of an electronic device including a portion of the FPCB from which a ground area is partially removed according to an embodiment.
Figure 17C:
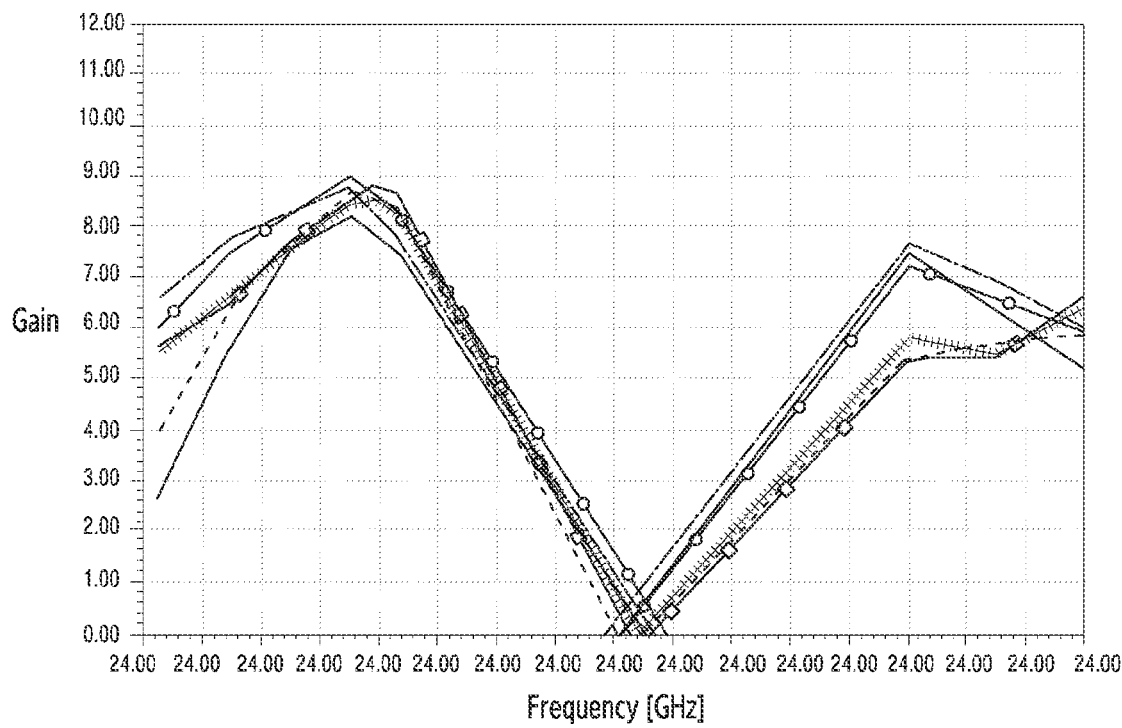
FIG. 17C illustrates graphs representing gains of an antenna array when the ground area of the FPCB is entirely or partially removed according to an embodiment.

FIG. 17A is a perspective view of an electronic device 101 including a portion 1612 of the FPCB 1610 from which a ground area is entirely removed according to an embodiment. FIG. 17B is a perspective view of an electronic device 101 including a portion 1613 of the FPCB 1610 from which a ground area is partially removed according to an embodiment. FIG. 17C illustrates graphs representing gains of an antenna array 330 when the ground area of the FPCB 1610 is entirely or partially removed according to an embodiment.

Referring to FIGS. 17A, 17B, and 17C, the electronic device 101 may include a portion 1612 of the FPCB 1610 from which the ground area is entirely removed or a portion 1613 of the FPCB 1610 from which the ground area is partially removed.

According to an embodiment, the FPCB 1610 may be electrically connected to a ground line 613 electrically connected to a portion of the at least one dome switch 3201 or 3202 and a signal line 615 electrically connected to another portion of the at least one dome switch 3201 or 3202.

According to an embodiment, the first dome switch 3201 may be located between the first conductive patch 332 and the second conductive patch 334, and the second dome switch 3202 may be located between the third conductive patch 336 and the fourth conductive patch 338.

According to an embodiment, when the electronic device 101 includes a portion 1612 of the FPCB 1610 from which the ground area is entirely removed and vertical polarization or horizontal polarization is performed in a low-frequency band or a high-frequency band, the antenna radiation gain can be improved the ground area in the FPCB 1610 is compared to the case where the ground area is not removed from the FPCB 1610.

According to an embodiment, when the electronic device 101 includes a portion 1613 of the FPCB 1610 from which the ground area is partially removed and vertical polarization or horizontal polarization is performed in a low-frequency band or a high-frequency band, the antenna radiation gain can be improved the ground area in the FPCB 1610 is compared to the case where the ground area is not removed from the FPCB 1610.

TABLE 1

| | Gain [dB] | | | | | |
| --- | --- | --- | --- | --- | --- | --- |
| | Low-frequency band | | Mid-frequency band | | High-frequency band | |
| | Horizontal polarization | Vertical polarization | Horizontal polarization | Vertical polarization | Horizontal polarization | Vertical polarization |
| Without removing ground area | 4.0 | 2.9 | 8.3 | 7.4 | 5.7 | 4.2 |
| Entirely removing ground area | 5.6 | 5.0 | 8.5 | 8.2 | 5.4 | 6.0 |
| Partially removing ground area | 5.5 | 6.6 | 8.4 | 7.8 | 5.5 | 6.0 |

Referring to Table 1, when the ground area is entirely or partially removed from the FPCB 1610, in all of the frequency bands, the antenna radiation gain may be improved compared to the case where the ground area is not removed. When the electronic device 101 includes the portion 1613 of the FPCB 1610 from which the ground area is partially removed, the antenna radiation gain may be greatly improved in the case of vertical polarization in all of the frequency bands.

According to an embodiment, when the electronic device 101 includes the portion 1613 of the FPCB 1610 from which the ground area is partially removed, in the case of vertical polarization in all of the frequency bands, the antenna radiation gain may be further improved compared to the case where the electronic device 101 includes the portion 1612 of the FPCB 1610 from which the ground area is entirely removed.

According to an embodiment, when the electronic device 101 includes the portion 1612 of the FPCB 1610 from which the ground area is entirely removed, in the case of horizontal polarization in the low-frequency band and the mid-frequency band, the antenna radiation gain may be further improved compared to the case where the electronic device 101 includes the portion 1613 of the FPCB 1610 from which the ground area is partially removed.

Figure 18A:
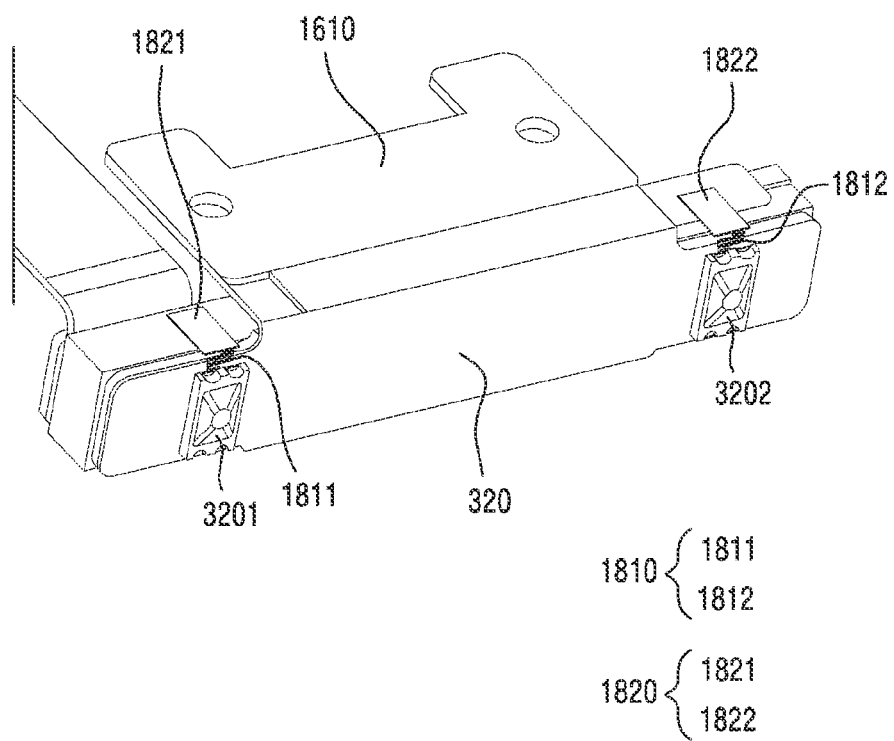
FIG. 18A is a perspective view of an electronic device including at least one meander conducting wire according to an embodiment.
Figure 18B:
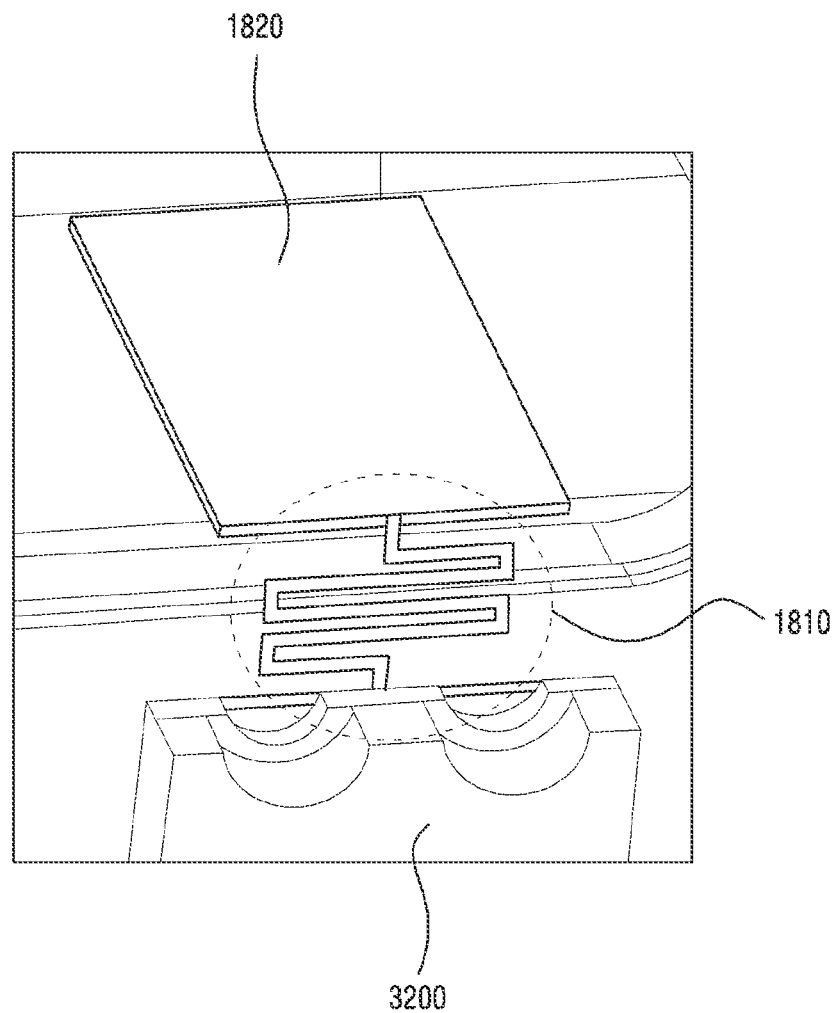
FIG. 18B illustrates the at least one meander conducting wire connected to at least one dome switch according to an embodiment.
Figure 18C:
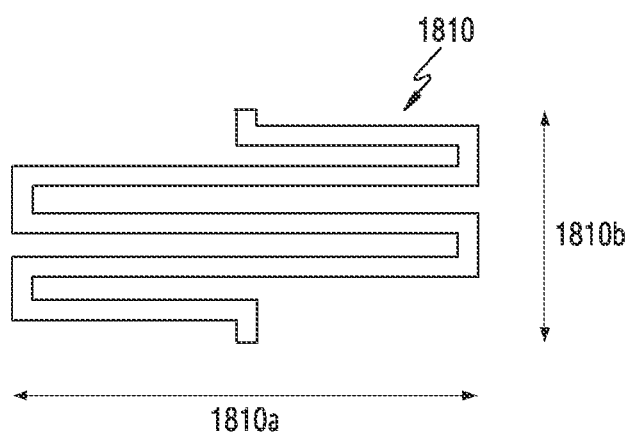
FIG. 18C is an enlarged view of the at least one meander conducting wire according to an embodiment.

FIG. 18A is a perspective view of an electronic device 101 including at least one meander conducting wire 1810 according to an embodiment. FIG. 18B illustrates the at least one meander conducting wire 1810 connected to at least one dome switch 3200 according to an embodiment. FIG. 18C is an enlarged view of the at least one meander conducting wire 1810 according to an embodiment.

Referring to FIGS. 18A, 18B, and 18C, the electronic device 101 may include at least one meander conducting wire 1810 or at least one conductive pad 1820. The meander conducting wire 1810 may mean a conductive line having a bent shape. The electronic device 101 may include an FPCB 1610.

According to an embodiment, the at least one meander conducting wire 1810 may include a first meander conducting wire 1811 or a second meander conducting wire 1812. In one example, the at least one meander conducting wire 1810 may include only one of the first meander conducting wire 1811 or the second meander conducting wire 1812.

According to an embodiment, the first meander conducting wire 1811 may be electrically connected to a first dome switch 3201 provided on the first substrate 320 and the first conductive pad 1821, and the second meander conducting wire 1812 may be electrically connected to a second dome switch 3202 provided on the first substrate 320 and the second conductive pad 1822.

According to an embodiment, the at least one meander conducting wire 1810 may have a first width 1810*a* and a second width 1810*b*. In an example, the first width 1810*a* may be 0.85 mm, but is not limited to the value. In an example, the second width 1810*b* may have various values depending on the position where the at least one dome switch 3200 is disposed on the first substrate 320. In an example, the second width 1810*b* may be 0.5 mm, but is not limited to the value.

Figure 19:
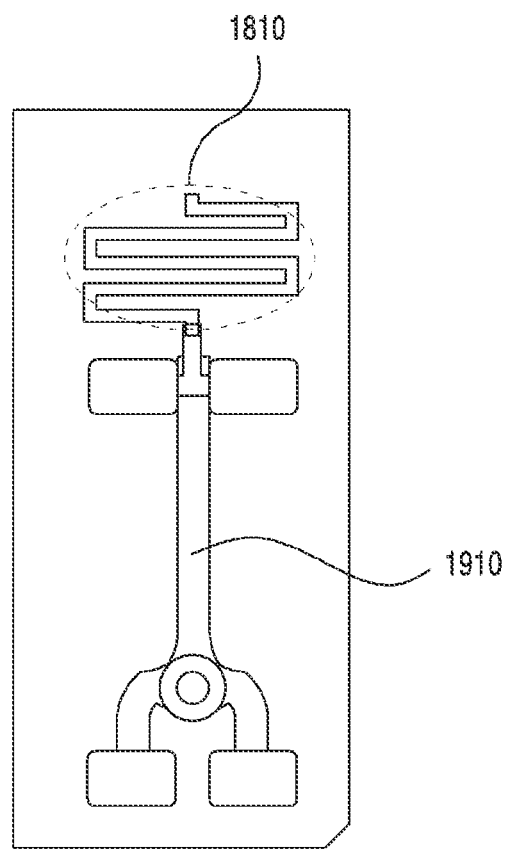
FIG. 19 illustrates at least one meander conducting wire connected to a wire included in the at least one dome switch according to an embodiment.

FIG. 19 illustrates at least one meander conducting wire 1810 connected to a wire 1910 included in the at least one dome switch 3200 according to an embodiment.

Referring to FIG. 19, the at least one meander conducting wire 1810 may be electrically connected to the wire 1910 included in the dome switch 3200.

According to an embodiment, the first meander conducting wire 1811 may be electrically connected to the wire 1910 included in the first dome switch 3201. According to another embodiment, the second meander conducting wire 1812 may be electrically connected to the wire 1910 included in the second dome switch 3202.

Figure 20A:
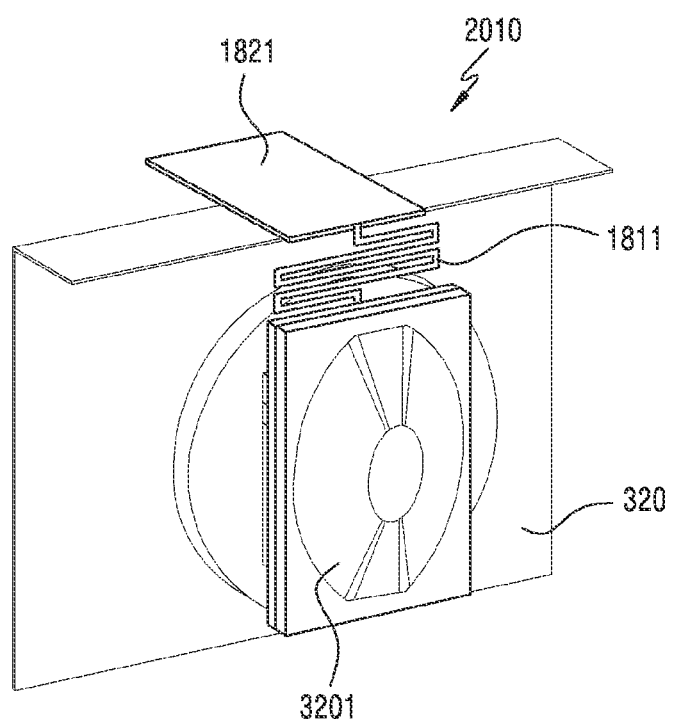
FIG. 20A is a perspective view of an electronic device including a first meander conducting wire.
Figure 20B:
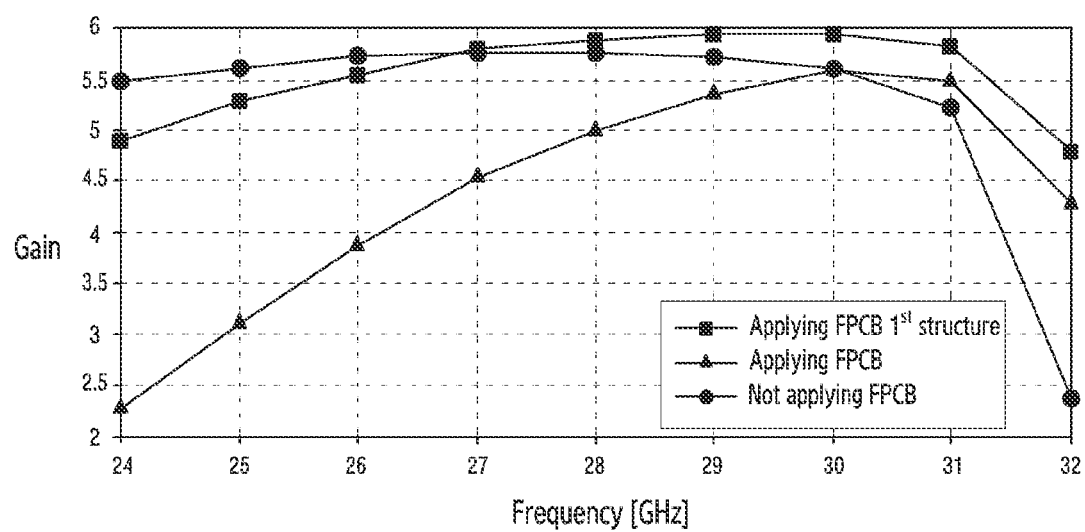
FIG. 20B illustrates graphs representing gains of the antenna array in the electronic device according to FIG. 20A.

FIG. 20A is a perspective view of an electronic device 101 including the first meander conducting wire 1811. FIG. 20B illustrates a graph representing gains of the antenna array 330 in the electronic device 101 according to FIG. 20A.

Referring to FIGS. 20A and 20B, a first structure 2010 may include a first dome switch 3201 provided in a portion of the first substrate 320 and the first meander conducting wire 1821 electrically connected to the first conductive pad 1811.

According to an embodiment, when the electronic device 101 includes the first structure 2010, the antenna radiation gain may be improved in the frequency band of about 24 GHz to about 32 GHz compared to the case where only the FPCB 1610 is applied.

According to an embodiment, when the electronic device 101 includes the first structure 2010, the antenna radiation gain may be improved in the frequency band of about 27 GHz to about 32 GHz compared to the case where the FPCB 1610 is not applied.

Figure 21A:
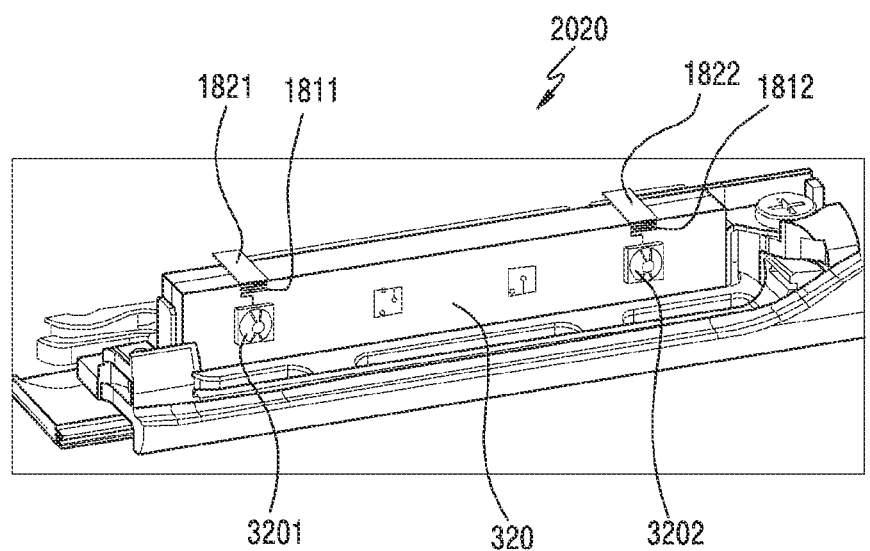
FIG. 21A is a perspective view of an electronic device including a first meander conducting wire and a second meander conducting wire.

FIG. 21A is a perspective view of an electronic device 101 including the first meander conducting wire 1811 and the second meander conducting wire 1812. FIG. 20B illustrates graphs representing gains of the antenna array 330 in the electronic device 101 according to FIG. 21A.

Figure 21B:
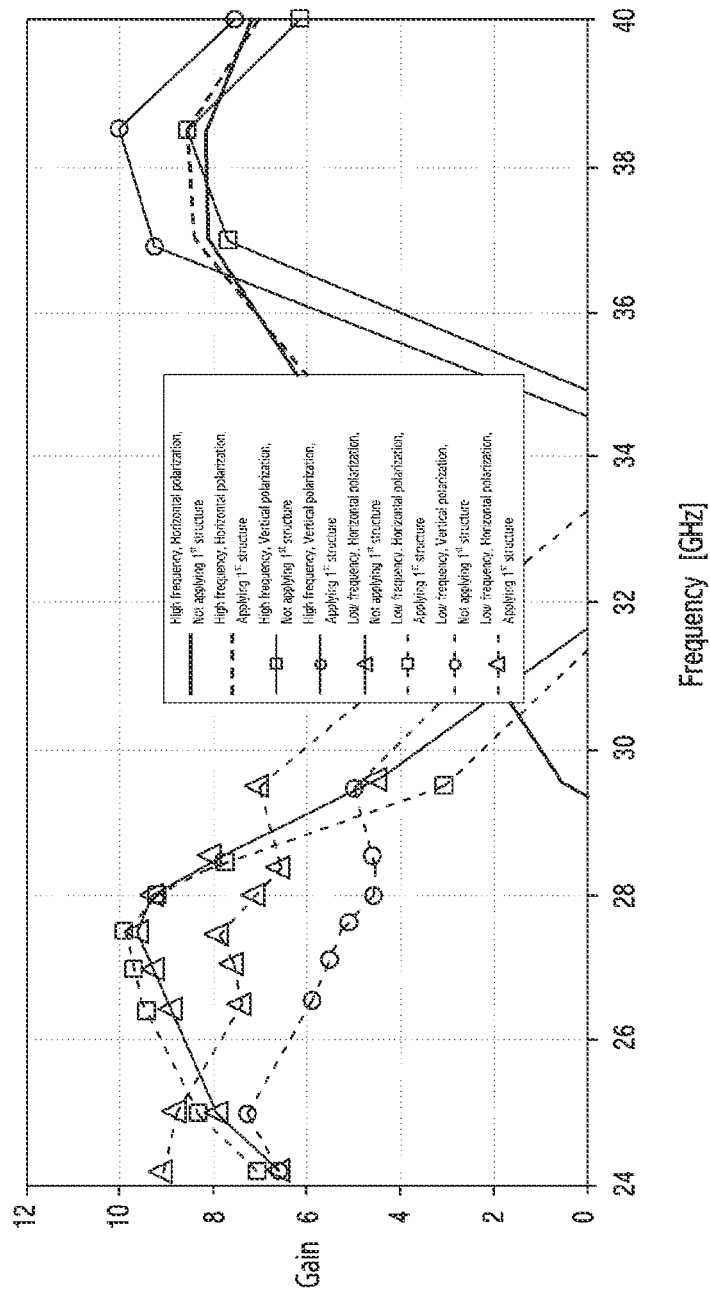
FIG. 21B illustrates graphs representing gains of the antenna array in the electronic device according to FIG. 21A.

Referring to FIGS. 21A and 21B, the second structure 2020 may include the first dome switch 3201 provided on a portion of the first substrate 320, the first meander conducting wire 1811 electrically connected to the first conductive pad 1821, the second dome switch 3202 provided on a portion of the first substrate 320, and the second meander conducting wire 1812 electrically connected to the second conductive pad 1822.

According to an embodiment, when the electronic device 101 has the second structure 2020, in the case of vertical polarization or horizontal polarization in the low-frequency band or the high-frequency band, the antenna radiation gain may be improved in the frequency band of about 24 GHz to about 40 GHz.

Figure 22:
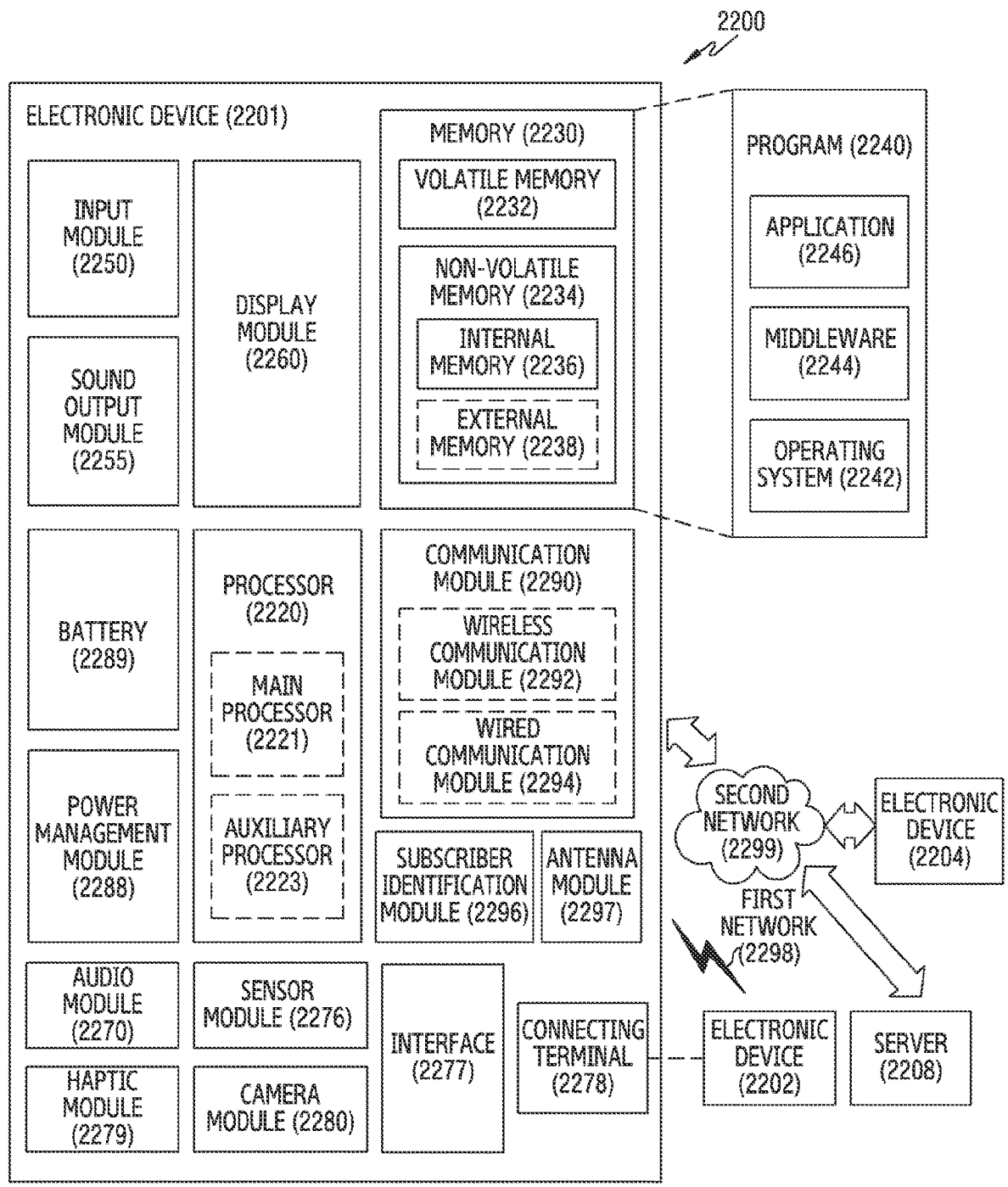
FIG. 22 is a block diagram of an electronic device according to various embodiments in a network environment.

FIG. 22 is a block diagram illustrating an electronic device 2201 in a network environment 2200 according to various embodiments. Referring to FIG. 22, the electronic device 2201 in the network environment 2200 may communicate with an electronic device 2202 via a first network 2298 (e.g., a short-range wireless communication network), or at least one of an electronic device 2204 or a server 2208 via a second network 2299 (e.g., a long-range wireless communication network). According to an embodiment, the electronic device 2201 may communicate with the electronic device 2204 via the server 2208. According to an embodiment, the electronic device 2201 may include a processor 2220, memory 2230, an input module 2250, a sound output module 2255, a display module 2260, an audio module 2270, a sensor module 2276, an interface 2277, a connecting terminal 2278, a haptic module 2279, a camera module 2280, a power management module 2288, a battery 2289, a communication module 2290, a subscriber identification module (SIM) 2296, or an antenna module 2297. In some embodiments, at least one of the components (e.g., the connecting terminal 2278) may be omitted from the electronic device 2201, or one or more other components may be added in the electronic device 2201. In some embodiments, some of the components (e.g., the sensor module 2276, the camera module 2280, or the antenna module 2297) may be implemented as a single component (e.g., the display module 2260).

The processor 2220 may execute, for example, software (e.g., a program 2240) to control at least one other component (e.g., a hardware or software component) of the electronic device 2201 coupled with the processor 2220, and may perform various data processing or computation. According to one embodiment, as at least part of the data processing or computation, the processor 2220 may store a command or data received from another component (e.g., the sensor module 2276 or the communication module 2290) in volatile memory 2232, process the command or the data stored in the volatile memory 2232, and store resulting data in non-volatile memory 2234. According to an embodiment, the processor 2220 may include a main processor 2221 (e.g., a central processing unit (CPU) or an application processor (AP)), or an auxiliary processor 2223 (e.g., a graphics processing unit (GPU), a neural processing unit (NPU), an image signal processor (ISP), a sensor hub processor, or a communication processor (CP)) that is operable independently from, or in conjunction with, the main processor 2221. For example, when the electronic device 2201 includes the main processor 2221 and the auxiliary processor 2223, the auxiliary processor 2223 may be adapted to consume less power than the main processor 2221, or to be specific to a specified function. The auxiliary processor 2223 may be implemented as separate from, or as part of the main processor 2221.

The auxiliary processor 2223 may control at least some of functions or states related to at least one component (e.g., the display module 2260, the sensor module 2276, or the communication module 2290) among the components of the electronic device 2201, instead of the main processor 2221 while the main processor 2221 is in an inactive (e.g., sleep) state, or together with the main processor 2221 while the main processor 2221 is in an active state (e.g., executing an application). According to an embodiment, the auxiliary processor 2223 (e.g., an image signal processor or a communication processor) may be implemented as part of another component (e.g., the camera module 2280 or the communication module 2290) functionally related to the auxiliary processor 2223. According to an embodiment, the auxiliary processor 2223 (e.g., the neural processing unit) may include a hardware structure specified for artificial intelligence model processing. An artificial intelligence model may be generated by machine learning. Such learning may be performed, e.g., by the electronic device 2201 where the artificial intelligence is performed or via a separate server (e.g., the server 2208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 2230 may store various data used by at least one component (e.g., the processor 2220 or the sensor module 2276) of the electronic device 2201. The various data may include, for example, software (e.g., the program 2240) and input data or output data for a command related thereto. The memory 2230 may include the volatile memory 2232 or the non-volatile memory 2234.

The program 2240 may be stored in the memory 2230 as software, and may include, for example, an operating system (OS) 2242, middleware 2244, or an application 2246.

The input module 2250 may receive a command or data to be used by another component (e.g., the processor 2220) of the electronic device 2201, from the outside (e.g., a user) of the electronic device 2201. The input module 2250 may include, for example, a microphone, a mouse, a keyboard, a key (e.g., a button), or a digital pen (e.g., a stylus pen).

The sound output module 2255 may output sound signals to the outside of the electronic device 2201. The sound output module 2255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 2260 may visually provide information to the outside (e.g., a user) of the electronic device 2201. The display module 2260 may include, for example, a display, a hologram device, or a projector and control circuitry to control a corresponding one of the display, hologram device, and projector. According to an embodiment, the display module 2260 may include a touch sensor adapted to detect a touch, or a pressure sensor adapted to measure the intensity of force incurred by the touch.

The audio module 2270 may convert a sound into an electrical signal and vice versa. According to an embodiment, the audio module 2270 may obtain the sound via the input module 2250, or output the sound via the sound output module 2255 or a headphone of an external electronic device (e.g., an electronic device 2202) directly (e.g., wiredly) or wirelessly coupled with the electronic device 2201.

The sensor module 2276 may detect an operational state (e.g., power or temperature) of the electronic device 2201 or an environmental state (e.g., a state of a user) external to the electronic device 2201, and then generate an electrical signal or data value corresponding to the detected state. According to an embodiment, the sensor module 2276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2277 may support one or more specified protocols to be used for the electronic device 2201 to be coupled with the external electronic device (e.g., the electronic device 2202) directly (e.g., wiredly) or wirelessly. According to an embodiment, the interface 2277 may include, for example, a high definition multimedia interface (HDMI), a universal serial bus (USB) interface, a secure digital (SD) card interface, or an audio interface.

A connecting terminal 2278 may include a connector via which the electronic device 2201 may be physically connected with the external electronic device (e.g., the electronic device 2202). According to an embodiment, the connecting terminal 2278 may include, for example, a HDMI connector, a USB connector, a SD card connector, or an audio connector (e.g., a headphone connector).

The haptic module 2279 may convert an electrical signal into a mechanical stimulus (e.g., a vibration or a movement) or electrical stimulus which may be recognized by a user via his tactile sensation or kinesthetic sensation. According to an embodiment, the haptic module 2279 may include, for example, a motor, a piezoelectric element, or an electric stimulator.

The camera module 2280 may capture a still image or moving images. According to an embodiment, the camera module 2280 may include one or more lenses, image sensors, image signal processors, or flashes.

The power management module 2288 may manage power supplied to the electronic device 2201. According to one embodiment, the power management module 2288 may be implemented as at least part of, for example, a power management integrated circuit (PMIC).

The battery 2289 may supply power to at least one component of the electronic device 2201. According to an embodiment, the battery 2289 may include, for example, a primary cell which is not rechargeable, a secondary cell which is rechargeable, or a fuel cell.

The communication module 2290 may support establishing a direct (e.g., wired) communication channel or a wireless communication channel between the electronic device 2201 and the external electronic device (e.g., the electronic device 2202, the electronic device 2204, or the server 2208) and performing communication via the established communication channel. The communication module 2290 may include one or more communication processors that are operable independently from the processor 2220 (e.g., the application processor (AP)) and supports a direct (e.g., wired) communication or a wireless communication. According to an embodiment, the communication module 2290 may include a wireless communication module 2292 (e.g., a cellular communication module, a short-range wireless communication module, or a global navigation satellite system (GNSS) communication module) or a wired communication module 2294 (e.g., a local area network (LAN) communication module or a power line communication (PLC) module). A corresponding one of these communication modules may communicate with the external electronic device via the first network 2298 (e.g., a short-range communication network, such as Bluetooth™, wireless-fidelity (Wi-Fi) direct, or infrared data association (IrDA)) or the second network 2299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2292 may identify and authenticate the electronic device 2201 in a communication network, such as the first network 2298 or the second network 2299, using subscriber information (e.g., international mobile subscriber identity (IMSI)) stored in the subscriber identification module 2296.

The wireless communication module 2292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 2292 may support a high-frequency band (e.g., the mmWave band) to achieve, e.g., a high data transmission rate. The wireless communication module 2292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 2292 may support various requirements specified in the electronic device 2201, an external electronic device (e.g., the electronic device 2204), or a network system (e.g., the second network 2299). According to an embodiment, the wireless communication module 2292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 2297 may transmit or receive a signal or power to or from the outside (e.g., the external electronic device) of the electronic device 2201. According to an embodiment, the antenna module 2297 may include an antenna including a radiating element composed of a conductive material or a conductive pattern formed in or on a substrate (e.g., a printed circuit board (PCB)). According to an embodiment, the antenna module 2297 may include a plurality of antennas (e.g., array antennas). In such a case, at least one antenna appropriate for a communication scheme used in the communication network, such as the first network 2298 or the second network 2299, may be selected, for example, by the communication module 2290 (e.g., the wireless communication module 2292) from the plurality of antennas. The signal or the power may then be transmitted or received between the communication module 2290 and the external electronic device via the selected at least one antenna. According to an embodiment, another component (e.g., a radio frequency integrated circuit (RFIC)) other than the radiating element may be additionally formed as part of the antenna module 2297.

According to various embodiments, the antenna module 2297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2201 and the external electronic device 2204 via the server 2208 coupled with the second network 2299. Each of the electronic devices 2202 or 2204 may be a device of a same type as, or a different type, from the electronic device 2201. According to an embodiment, all or some of operations to be executed at the electronic device 2201 may be executed at one or more of the external electronic devices 2202, 2204, or 2208. For example, if the electronic device 2201 should perform a function or a service automatically, or in response to a request from a user or another device, the electronic device 2201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2201. The electronic device 2201 may provide the outcome, with or without further processing of the outcome, as at least part of a reply to the request. To that end, a cloud computing, distributed computing, mobile edge computing (MEC), or client-server computing technology may be used, for example. The electronic device 2201 may provide ultra low-latency services using, e.g., distributed computing or mobile edge computing. In another embodiment, the external electronic device 2204 may include an internet-of-things (IoT) device. The server 2208 may be an intelligent server using machine learning and/or a neural network. According to an embodiment, the external electronic device 2204 or the server 2208 may be included in the second network 2299. The electronic device 2201 may be applied to intelligent services (e.g., smart home, smart city, smart car, or healthcare) based on 5G communication technology or IoT-related technology.

Figure 23:
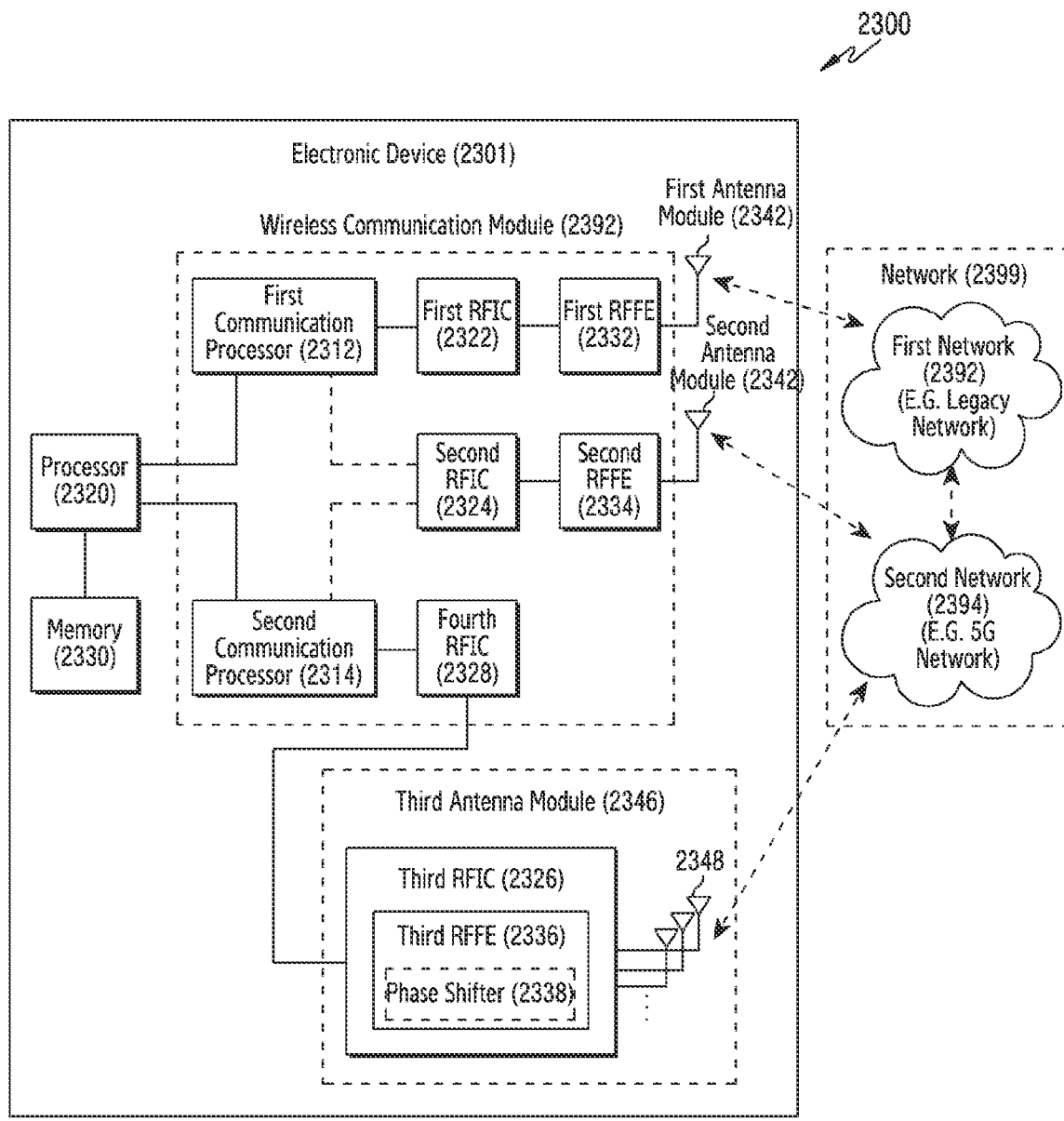
FIG. 23 is a block diagram of an electronic device configured to support legacy network communication and 5G network communication according to various embodiments.

FIG. 23 is a block diagram 2300 of an electronic device 2201 configured to support a legacy network communication and a 5G network communication, according to various embodiments. Referring to FIG. 23, the electronic device 2201 may include a first communication processor 2312, a second communication processor 2314, a first radio frequency integrated circuit (RFIC) 2322, a second RFIC 2324, a third RFIC 2326, a fourth RFIC 2328, a first radio frequency front end (RFFE) 2332, a second RFFE 2334, a first antenna module 2342, a second antenna module 2344, and an antenna 2348. The electronic device 2201 may further include a processor 2220 and a memory 2230. The network 2299 may include a first network 2392 and a second network 2394. According to another embodiment, the electronic device 2201 may further include at least one of the components illustrated in FIG. 22, and the network 2299 may further include one or more other networks. According to an embodiment, the first communication processor 2312, the second communication processor 2314, the first RFIC 2322, the second RFIC 2324, the fourth RFIC 2328, the first RFFE 2332, and the second RFFE 2334 may configure at least a portion of a wireless communication module 2292. According to another embodiment, the fourth RFIC 2328 may be omitted, or may be included as a portion of the third RFIC 2326.

The first communication processor 2312 may establish a communication channel in a band to be used for RF communication with the first network 2392, and may support legacy network communication via the established communication channel. According to various embodiments, the first network may be a legacy network including a $2^{nd}$ generation (2G), 3G, 4G, or long-term evolution (LTE) network. The second communication processor 2314 may establish a communication channel corresponding to a designated band (e.g., about 6 GHz to about 60 GHz) in a band to be used for RF communication with the second network 2394, and may support 5G network communication via the established communication channel. According to various embodiments, the second network 2394 may be a 5G network defined in the 3GPP. In addition, according to an embodiment, the first communication processor 2312 or the second communication processor 2314 may establish a communication channel corresponding to another predetermined band (e.g., about 6 GHz or lower) in the band to be used for RF communication with the second network 2394 and may support 5G network communication via the established communication channel. According to an embodiment, the first communication processor 2312 and the second communication processor 2314 may be implemented in a single chip or in a single package. According to various embodiments, the first communication processor 2312 or the second communication processor 2314 may be configured in a single chip or a single package with the processor 2220, an auxiliary processor 2223, or a communication module 2290.

During transmission, the first RFIC 2322 may convert a baseband signal generated by the first communication processor 2312 into an RF signal of about 700 MHz to about 3 GHz to be used in the first network 2392 (e.g., a legacy network). During reception, an RF signal may be acquired from the first network 2392 (e.g., the legacy network) via an antenna (e.g., the first antenna module 2342), and may be preprocessed through an RFFE (e.g., the first RFFE 2332). The first RFIC 2322 may convert the preprocessed RF signal into a baseband signal to be processed by the first communication processor 2312.

During transmission, the second RFIC 2324 may convert a baseband signal generated by the first communication processor 2312 or the second communication processor 2314 into an RF signal in a Sub6 band (e.g., about 6 GHz or lower) (hereinafter, referred to as a "5G Sub6 RF signal") to be used in the second network 2394 (e.g., a 5G network). During reception, the 5G Sub6 RF signal may be acquired from the second network 2394 (e.g., a 5G network) via an antenna (e.g., the second antenna module 2344), and may be preprocessed through an RFFE (e.g., the second RFFE 2334). The second RFIC 2324 may convert the preprocessed 5G Sub6 RF signal into a baseband signal to be processed by a corresponding one of the first communication processor 2312 or the second communication processor 2314.

The third RFIC 2326 may convert the baseband signal generated by the second communication processor 2314 into an RF signal in a 5G Above6 band (e.g., about 6 GHz to about 60 GHz) (hereinafter, referred to as a "5G Above6 RF signal") to be used in the second network 2394 (e.g., a 5G network). During reception, the 5G Above6 RF signal may be acquired from the second network 2394 (e.g., a 5G network) via an antenna (e.g., the antenna 2348), and may be preprocessed via the third RFFE 2336. The third RFIC 2326 may convert the preprocessed 5G Above6 RF signal into a baseband signal to be processed by the second communication processor 2314. According to an embodiment, the third RFFE 2336 may be provided as a portion of the third RFIC 2326.

According to an embodiment, the electronic device 2201 may include a fourth RFIC 2328 separately from the third RFIC 2326 or as at least a portion of the third RFIC 1326. In this case, the fourth RFIC 2328 may convert the baseband signal generated by the second communication processor 2314 into an RF signal (hereinafter, referred to as an "IF signal") in an intermediate-frequency band (e.g., about 9 GHz to about 11 GHz) and may then deliver the IF signal to the third RFIC 2326. The third RFIC 2326 may convert the IF signal into a 5G Above6 RF signal. During reception, the 5G Above6 RF signal may be received from the second network 2394 (e.g., a 5G network) via an antenna (e.g., the antenna 2348), and may be converted into an IF signal through the third RFIC 2326. The fourth RFIC 2328 may convert the IF signal into a baseband signal to be processed by the second communication processor 2314.

According to an embodiment, the first RFIC 2322 and the second RFIC 2324 may be implemented as at least a portion of a single chip or a single package. According to an embodiment, the first RFFE 2332 and the second RFFE 2334 may be implemented as at least a portion of a single chip or a single package. According to an embodiment, at least one of the first antenna module 2342 and the second antenna module 2344 may be omitted, or may be combined with another antenna module to process RF signals of multiple corresponding bands.

According to an embodiment, the third RFIC 2326 and the antenna 2348 may be disposed on the same substrate to provide a third antenna module 2346. For example, the wireless communication module 2292 or the processor 2220 may be placed on a first substrate (e.g., a main PCB). In such a case, the third RFIC 2326 may be disposed on a partial area (e.g., the top surface) of a second substrate (e.g., a sub-PCB) separate from the first substrate, and the antenna 2348 may be disposed on another partial area (e.g., the bottom surface), thereby configuring the third antenna module 2346. By disposing the third RFIC 2326 and the antenna 2348 on the same substrate, it is possible to reduce the length of the transmission line therebetween. Through this, it is possible to reduce the loss (e.g., attenuation) of signals in a high-frequency band (e.g., about 6 GHz to about 60 GHz) to be used for, for example, 5G network communication by the transmission line. As a result, the electronic device 2201 is able to improve the quality or speed of communication with the second network 2394 (e.g., a 5G network).

According to an embodiment, the antenna 2348 may be configured as an antenna array that includes multiple antenna elements that can be used for beamforming. In this case, the third RFIC 2326 may include multiple phase shifters 2338 corresponding to the multiple antenna elements, for example, as a part of the third RFFE 2336. During transmission, each of the multiple phase shifters 2338 may convert the phase of a 5G Above6 RF signal to be transmitted to the outside of the electronic device 2201 (e.g., a base station of a 5G network) via a corresponding antenna element. During reception, each of the multiple phase shifters 2338 may convert the phase of the 5G Above6 RF signal received from the outside into the same or substantially the same phase via the corresponding antenna element. This enables transmission or reception through beamforming between the electronic device 2201 and the outside.

The second network 2394 (e.g., a 5G network) may be operated independently from the first network 2392 (e.g., a legacy network) (e.g., stand-alone (SA)), or may be operated in the state of being connected to the first network 2392 (e.g., non-stand-alone (NSA)). For example, a 5G network may include only an access network (e.g., a 5G radio access network (RAN) or a next-generation RAN (NG RAN)) but may not include a core network (e.g., a next-generation core (NGC)). In this case, after accessing the access network of the 5G network, the electronic device 2201 may access an external network (e.g., the Internet) under the control of the core network (e.g., an evolved packed core (EPC)) of a legacy network. Protocol information for communication with a legacy network (e.g., LTE protocol information) or protocol information for communication with a 5G network (e.g., new radio (NR) protocol information) may be stored in the memory 2330 and may be accessed by another component (e.g., the processor 2220, the first communication processor 2312, or the second communication processor 2314).

According to various embodiments, an electronic device may include a housing, a flexible display defining at least a portion of a front surface of the electronic device in a state in which the housing is unfolded, wherein the flexible display is disposed over the first part and the second part, a key button disposed in a first area of a side surface of the first part, wherein the key button includes at least one protrusion extending toward inside of the first part, and an antenna structure disposed in the inside of the first part with respect to the first area. The housing may include the first part, the second part, and a connecting portion disposed between the first part and the second part, and the second part is rotatably connected to the first part via the connecting portion. The antenna structure may include a substrate including multiple layers in which conductive layers and non-conductive layers are alternately stacked, at least one dome switch disposed above the substrate at a position corresponding to the at least one protrusion, and a plurality of conductive patches provided in the conductive layers of the substrate, and the at least one dome switch may be disposed at a position corresponding to a space between adjacent ones of the plurality of conductive patches.

According to an embodiment, the electronic device may further include a dielectric layer interposed between the at least one dome switch and the substrate, and the at least one dome switch may be disposed on the dielectric layer to face the at least one protrusion.

According to an embodiment, the at least one protrusion may include a first protrusion and a second protrusion, and the at least one dome switch may include a first dome switch overlapping the first protrusion and a second dome switch overlapping the second protrusion.

According to an embodiment, the key button may extend in a longitudinal direction along the side surface, the first protrusion is disposed closer to one end of the key button than the other end of the key button, and the second protrusion is disposed closer to the other end than the one end of the key button.

According to an embodiment, the plurality of conductive patches may include a first conductive patch, a second conductive patch, a third conductive patch, a fourth conductive patch, and a fifth conductive patch. The first conductive patch, the second conductive patch, the third conductive patch, the fourth conductive patch, and the fifth conductive patch may be spaced apart from each other and arranged in a line, the first dome switch may be disposed at a position corresponding a space between the first conductive patch and the second conductive patch on the dielectric layer, and the second dome switch may be disposed at a position corresponding to a space between the fourth conductive patch and the fifth conductive patch on the dielectric layer.

According to an embodiment, the first conductive patch and the second conductive patch may be spaced apart from each other by a first predetermined distance, the second conductive patch and the third conductive patch may be spaced apart from each other by a second predetermined distance, and the first distance may be greater than the second distance.

According to an embodiment, the third conductive patch and the fourth conductive patch may be spaced apart from each other by the second predetermined distance, and the fourth conductive patch and the fifth conductive patch may be spaced apart from each other by the first predetermined distance.

According to an embodiment, the first dome switch may be spaced apart from the first conductive patch and the second conductive patch by a third predetermined distance when the first dome switch is viewed in a direction toward the inside.

According to an embodiment, the at least one dome switch may be spaced apart from the plurality of conductive patches when the at least one dome switch is viewed in a direction toward the inside.

According to an embodiment, the at least one dome switch may have a rectangular or square shape.

According to an embodiment, the at least one dome switch may have a rectangular shape with long edges and short edges, and the at least one dome switch may be disposed such that the long edges face the plurality of conductive patches.

According to an embodiment, the electronic device may include a printed circuit board disposed in the first part, and a connecting member electrically connecting the at least one dome switch and the printed circuit board to each other.

According to an embodiment, the connecting member may include a conductive via that penetrates at least a portion of the substrate and the dielectric layer.

According to an embodiment, the connecting member may include a flexible printed circuit board, and the flexible printed circuit board may extend from the at least one dome switch to the printed circuit board along a periphery of the dielectric layer and the board.

According to an embodiment, the flexible printed circuit board may be spaced apart from the substrate of the antenna structure.

According to an embodiment, the electronic device may include at least one inductor disposed between the at least one dome switch and an electrical path of the printed circuit board.

According to an embodiment, at least a portion of the key button may protrude to the outside of the side surface.

According to an embodiment, the at least one protrusion may include a first protrusion and a second protrusion, and the at least one dome switch may include a first dome switch overlapping the first protrusion and a second dome switch overlapping the second protrusion. The plurality of conductive patches may include a first conductive patch, a second conductive patch, a third conductive patch, a fourth conductive patch, and a fifth conductive patch. The first conductive patch, the second conductive patch, the third conductive patch, and the fourth conductive patch may be spaced apart from each other and arranged in a line, the first dome switch may be disposed at a position corresponding a space between the first conductive patch and the second conductive patch on the dielectric layer, and the second dome switch may be disposed at a position corresponding to a space between the third conductive patch and the fourth conductive patch on the dielectric layer.

According to an embodiment, the at least one protrusion may include a first protrusion and a second protrusion, and the at least one dome switch may include a first dome switch overlapping the first protrusion and a second dome switch overlapping the second protrusion. The plurality of conductive patches may include a first conductive patch, a second conductive patch, a third conductive patch, a fourth conductive patch, and a fifth conductive patch. The substrate may include a first opening provided between the first conductive patch and the second conductive patch, and a second opening provided between the third conductive patch and the fourth conductive patch, and the entire first dome switch may be inserted into the first opening, and the entire second dome switch may be inserted into the second opening.

According to various embodiments, an electronic device may include a housing, a flexible display defining at least a portion of the front surface of the housing, a key button disposed in a first area of a side surface of the housing, wherein the key button includes at least one protrusion extending toward inside of the housing, and an antenna structure disposed in the inside of the housing with respect to the first area. The antenna structure may include a substrate including multiple layers in which a conductive layer and a non-conductive layer are alternately stacked. The at least one dome switch disposed above the substrate at a position corresponding to the at least one protrusion, and a plurality of conductive patches provided in the conductive layer of the substrate. The at least one dome switch may be disposed at a position corresponding to a space between adjacent ones of the plurality of conductive patches.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2240) including one or more instructions that are stored in a storage medium (e.g., internal memory 2236 or external memory 2238) that is readable by a machine (e.g., the electronic device 2201). For example, a processor (e.g., the processor 2220) of the machine (e.g., the electronic device 2201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Advantageous effects obtainable from the disclosure may not be limited to the above-mentioned effects, and other effects which are not mentioned may be clearly understood, through the following descriptions, by those skilled in the art to which the disclosure pertains.

The methods according to embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Furthermore, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
   a housing comprising a first part, a second part, and a connecting portion disposed between the first part and the second part, wherein the second part is rotatably coupled to the first part via the connecting portion;
   a flexible display forming at least a portion of a front surface of the electronic device in a state in which the housing is unfolded, wherein the flexible display is disposed over the first part and the second part;
   a key button disposed in a first area of a side surface of the first part, wherein the key button comprises at least one protrusion extending toward inside of the first part; and
   an antenna structure disposed in the inside of the first part with respect to the first area,
   wherein the antenna structure comprises:
   a substrate comprising multiple layers including a conductive layer and a non-conductive layer;
   at least one dome switch disposed on the substrate at a position corresponding to the at least one protrusion; and
   a plurality of conductive patches provided in the conductive layer of the substrate, and
   wherein the at least one dome switch is disposed at a position corresponding to a space between the plurality of conductive patches.

2. The electronic device of claim 1, wherein the antenna structure further comprises a dielectric layer interposed between the at least one dome switch and the substrate,
   wherein the at least one dome switch is disposed on the dielectric layer to face the at least one protrusion.

3. The electronic device of claim 2, wherein the at least one protrusion comprises a first protrusion and a second protrusion, and
   wherein the at least one dome switch comprises a first dome switch overlapping the first protrusion and a second dome switch overlapping the second protrusion.

4. The electronic device of claim 3, wherein the key button extends in a longitudinal direction along the side surface,
   wherein the first protrusion is disposed closer to one end of the key button than the other end of the key button, and wherein the second protrusion is disposed closer to the other end than the one end of the key button.

5. The electronic device of claim 3, wherein the plurality of conductive patches comprise a first conductive patch, a second conductive patch, a third conductive patch, a fourth conductive patch, and a fifth conductive patch,
wherein the first conductive patch, the second conductive patch, the third conductive patch, the fourth conductive patch, and the fifth conductive patch are spaced apart from each other and arranged in a line,
wherein the first dome switch is disposed at a position corresponding a space between the first conductive patch and the second conductive patch on the dielectric layer, and
wherein the second dome switch is disposed at a position corresponding to a space between the fourth conductive patch and the fifth conductive patch on the dielectric layer.

6. The electronic device of claim 5, wherein the first conductive patch and the second conductive patch are spaced apart from each other by a first predetermined distance,
wherein the second conductive patch and the third conductive patch are spaced apart from each other by a second predetermined distance, and
wherein the first predetermined distance is greater than the second predetermined distance.

7. The electronic device of claim 6, wherein the third conductive patch and the fourth conductive patch are spaced apart from each other by the second predetermined distance, and
wherein the fourth conductive patch and the fifth conductive patch are spaced apart from each other by the first predetermined distance.

8. The electronic device of claim 6, wherein the first dome switch is spaced apart from the first conductive patch and the second conductive patch by a third predetermined distance when the first dome switch is viewed in a direction toward the inside.

9. The electronic device of claim 2, further comprising:
a printed circuit board disposed in the first part; and
a connecting member electrically connecting the at least one dome switch and the printed circuit board.

10. The electronic device of claim 9, wherein the connecting member comprises a conductive via that penetrates at least a portion of the substrate and the dielectric layer.

11. The electronic device of claim 9, wherein the connecting member comprises a flexible printed circuit board, and
wherein the flexible printed circuit board extends from the at least one dome switch to the printed circuit board along a periphery of the dielectric layer and the board.

12. The electronic device of claim 11, wherein the flexible printed circuit board is spaced apart from the substrate of the antenna structure.

13. The electronic device of claim 12, further comprising:
at least one inductor disposed between the at least one dome switch and an electrical path of the printed circuit board.

14. The electronic device of claim 2, wherein the at least one protrusion includes a first protrusion and a second protrusion,
wherein the at least one dome switch includes a first dome switch overlapping the first protrusion and a second dome switch overlapping the second protrusion,
wherein the plurality of conductive patches include a first conductive patch, a second conductive patch, a third conductive patch, and a fourth conductive patch,
wherein the first conductive patch, the second conductive patch, the third conductive patch, and the fourth conductive patch are spaced apart from each other and arranged in a line,
wherein the first dome switch is disposed at a position corresponding a space between the first conductive patch and the second conductive patch on the dielectric layer, and
wherein the second dome switch is disposed at a position corresponding to a space between the third conductive patch and the fourth conductive patch on the dielectric layer.

15. The electronic device of claim 1, wherein the at least one dome switch is spaced apart from the plurality of conductive patches when the at least one dome switch is viewed in a direction toward the inside.

16. The electronic device of claim 1, wherein the at least one dome switch has a rectangular or square shape.

17. The electronic device of claim 1, wherein the at least one dome switch has a rectangular shape with long edges and short edges, and
wherein the at least one dome switch is disposed such that the long edges face the plurality of conductive patches.

18. The electronic device of claim 1, wherein at least a portion of the key button may protrude to the outside of the side surface.

19. The electronic device of claim 1, wherein the at least one dome switch are disposed in recessed portions of the substrate below a top surface of the substrate.

20. The electronic device of claim 1, further comprising a waterproof structure surrounding at least a portion of the key button.

* * * * *